Jan. 25, 1966 G. RIDDELL 3,231,675

MULTIDIGIT REGISTER CIRCUIT

Filed Aug. 28, 1961 11 Sheets-Sheet 1

INVENTOR
G. RIDDELL
BY [signature]
ATTORNEY

INVENTOR
G. RIDDELL
BY
[signature]
ATTORNEY

INVENTOR
G. RIDDELL
BY
S. Turner
ATTORNEY

INVENTOR
G. RIDDELL
BY [signature]
ATTORNEY

INVENTOR
G. RIDDELL
BY
[signature]
ATTORNEY

MULTIDIGIT REGISTER CIRCUIT

INVENTOR
G. RIDDELL
BY
[signature]
ATTORNEY

MULTIDIGIT REGISTER CIRCUIT

Filed Aug. 28, 1961 11 Sheets-Sheet 7

INVENTOR
G. RIDDELL
BY
[signature]
ATTORNEY

Jan. 25, 1966 G. RIDDELL 3,231,675

MULTIDIGIT REGISTER CIRCUIT

Filed Aug. 28, 1961 11 Sheets-Sheet 8

INVENTOR
G. RIDDELL
BY
[signature]
ATTORNEY

INVENTOR
G. RIDDELL
BY
[signature]
ATTORNEY

INVENTOR
G. RIDDELL
BY
[signature]

MULTIDIGIT REGISTER CIRCUIT

Filed Aug. 28, 1961 11 Sheets-Sheet 11

INVENTOR
G. RIDDELL
BY
[signature]
ATTORNEY

United States Patent Office 3,231,675

Patented Jan. 25, 1966

3,231,675
MULTIDIGIT REGISTER CIRCUIT

George Riddell, Lincroft, N.J., assignor to Bell Telephone Laboratories, Incorporated, New York, N.Y., a corporation of New York Filed Aug. 28, 1961, Ser. No. 134,524
6 Claims. (Cl. 179—18)

My invention relates generally to multidigit register circuits, more particularly to such a circuit having a plurality of operable, lockable and releasable digit registers and having means for operating the registers to register therein a received series of digits and having means for reading therefrom a registered series of digits, and specifically to such a circuit having register locking circuitry effective under the control of the read-out means for controlling the locking and releasing of the digit registers.

Register circuits of the type contemplated cannot, of course, have digits read therefrom until such digits have been registered therein. Thus, the usual locking circuitry has been placed under the control of the read-out means so as to permit operated registers to be locked operated until the read-out function has been completed. As soon as the read-out means has advanced from one register to another during the usual sequential read-out operation, the previously read-out register may be released, et cetera.

It is known in the art to employ such register circuits in a so-called recycle mode of operation where the series of digits to be processed exceeds the register capacity of the circuit. Within this mode of operation, and as soon as the last register has been operated, recycling circuitry becomes effective to enable extra received digits to be registered in some of the registers from which previous registered digits of the same series have been read out. Under these circumstances it has been necessary to render effective the locking circuits of these reused registers as soon as possible after the read-out operation concerning those previously registered earlier digits.

Where the rate of digit registration is sufficiently slow compared to the rate of digit read-out, as has been the usual case in the prior art, a relatively simple locking circuit has been employed wherein a particular operated register is locked operated until the read-out means has advanced to the point where some prescribed succeeding register is to be read out. This, the particular register locking circuit is usually rendered effective at all times except during the read-out interval of the related prescribed succeeding register.

In a plural register circuit subjected to the aforementioned usual slow rate of digit registration compared to the rate of digit read-out, the rendering of the register locking circuit ineffective during a subsequent read-out interval has proved satisfactory under recycle conditions because the read-out operation for the first few registered digits has occurred well in advance of the necessity to reuse those first few registers to register extra digits of the same series.

The rate of digit registration may be much faster than usual compared to the read-out rate. In a telephone system employing TOUCH-TONE calling for instance, a subscriber or operator, et cetera, has the capability of punching buttons very rapidly to transmit a series of digits. It may occur in such an instance that a register circuit is forced into a recycle condition so quickly that the extra digits tend to catch up to the read-out operations for previously registered digits. Such extra digit registrations may be lost (due to blocking of the circuitry, for instance) if the read-out operation has not advanced sufficiently to render effective the locking circuits for these early to-be-reused registers. In actual practice it has been found, for instance concerning a nine-digit-register circuit faced with the job of processing thirteen digits, that the tenth or eleventh or twelfth or thirteenth digit may come along so quickly that the respective first or second or third or fourth register (previously used to register the first or second or third or fourth respective digit) may not have been read out and released and may not have had its locking circuit rendered effective in time to lock operated according to the extra digit. The objectionable delay which accounts for this undesirable condition is represented by what now turns out to be an excessively long time interval during which a particular register locking circuit is rendered ineffective when measured by the read-out interval of that prescribed register related to the locking circuit control of the particular register concerned.

The principal object of my invention is to shorten the interval of time during which such register locking circuits are rendered ineffective.

Another object of my invention is to render effective such register locking circuits prior to the usual time of such events following read-out of registered information.

A specific object of my invention is to enable a recyclable multidigit register circuit to accommodate and process a series of digits in excess of the register capacity even though the rate of digit registration may be very much faster than the rate of digit read-out.

A particular object of my invention is to improve and adapt prior art recyclable multidigit register circuits to implement their ability to process digit registrations at a faster rate than heretofore has been possible.

I have embodied my invention in a recyclable multidigit register circuit adapted particularly to process a series of digits representing a telephone customer's called code. Such codes today may involve up to as many as thirteen or more separate digits depending upon the nature of the telephone connection desired. There are register circuits in the art which are capable of processing such a series of digits without a recycle mode of operation; however, there are an extremely large number of such circuits in use which are capable of processing only seven or eight or nine digits without recycling. The latter have heretofore proven satisfactory, but new art practice of transmitting digits has constantly increased the digit reception requirements to a point where the usual recycling locking circuits may fail to be effective soon enough to meet the speed requirements. This failure is generally traced to the circuits controlled by the read-out means and which are required to accomplish the register read-out and release functions and to reestablish locking circuitry soon enough to meet the increased speed of digit registration under recycle conditions.

It is the prime purpose of my invention to adapt and improve these recycle control circuits to satisfy the increased speed requirements.

The exemplary embodiment of my invention comprises a recycleable multidigit register circuit having nine registers arranged with control circuitry to receive and register and read out up to thirteen digits under conditions where the rate of digit resigstration may be extremely fast compared to the rate of read-out.

My invention is embodied in a TOUCH-TONE converter circuit which comprises means for receiving high speed multi-frequency digit signaling and for converting the latter into relatively slow speed conventional direct-current dial pulse digit signaling. Such a converter is required to be interposed between a TOUCH-TONE signaling source and conventional dial pulse controlled telephone switching equipment so that the latter can be effectively controlled according to the type of signaling to which it is adapted to respond. The TOUCH-TONE signal source may be a calling customer's substation terminating in the usual line finder of a step-by-step automatic telephone switching system. The converter is interposed between the line finder and the usual first selector so that the latter may be controlled from the converter by dial pulse signaling at a much slower digit rate than the rate at which the multifrequency digits can be dialed or keyed into the converter from a subscriber having TOUCH-TONE transmitting facilities.

The exemplary converter circuit comprises nine registers, an input steering circuit for operating successive registers according to successive received multifrequency digits, an output steering circuit for outpulsing these digits in the order registered, and recycle control for allowing the first four registers to be reused to register the tenth, eleventh, twelfth and thirteenth digits respectively. The output steering circuit includes an output connector for each register and these connectors are operated and released in sequence to sequentially read out successively registered digits. Outpulsing circuitry is provided for generating dial pulse digits under the control of the output steering connectors and the corresponding registered digits. The first four registers are provided with two locking circuits in parallel with each other: one of these circuits is made effective at all times except during the time that the next succeeding output connector is operated incident to reading out the next succeeding register content; and, the second such circuit is rendered effective before the next succeeding output connector eventually is released. The second circuit includes a special locking relay operated by the operation of the next succeeding output connector. This, in effect, completes the second locking circuit after a short interval dunring which the instant digit register is read out and released, whereupon the instant register again has an effective locking circuit during a second interval existing prior to the release of the next succeeding output connector. This additional locking circuitry is effective particularly in the first four registers so that, for instance, if an eleventh digit (to be degistered in the recycled second register) arrives before the read-out operation has been completed for the previously registered third digit (registered in the original cycle third register), it may be registered and locked in the recycled second register even though the third register output connector may not have released.

The main feature of my invention is the provision of two such locking circuits for particular registers in the recyclable multidigit register circuitry context above described.

A particular feature of my invention is the provision of a special relay controlled by the operation of a prescribed output connector to quickly reestablish and render effective a locking circuit for a preceding register without the necessity of waiting for the prescribed connector to again release.

Another particular feature of my invention is the provision of a first locking circuit controlled by an output connector for permitting the next preceding register to lock operated during the interval when the connector is released and to permit the next preceding register to release during the interval when the connector is operated, and the provision of a second locking circuit controlled by the same connector to permit the next preceding register to lock operated during a terminal portion of the connector operate interval.

Specifically, a feature of my invention contemplates a first locking circuit for a particular register comprising a back contact of the next succeeding connector and contemplates a second locking circuit for that particular register comprising a make contact of a special relay which is operated and locked operated upon the operation of that succeeding connector.

The foregoing objects and features, as well as others not specifically mentioned, will be apparent from the detailed description to follow of an exemplary embodiment of my invention, from the appended claims, and from the drawings in which:

FIG. 1 indicates, in block diagram form, the salient functions of the circuits embodying the instant invention and the inter-relation between the circuit functions;

FIGS. 10 and 11 show digit register circuitry, together with associated read-in connector circuitry, read-out connector circuitry, validity check circuitry, and locking circuitry, and wherein;

FIG. 10 shows circuitry pertaining to the registers A through D;

FIG. 11 shows circuitry pertaining to the registers E through H and J;

FIGS. 12 and 13 show operational sequence charts wherein;

FIG. 12 shows the sequence of operation of the input digit steering relays; and

FIG. 13 shows the sequence of operation of the output digit steering relays.

To facilitate a complete and clear understanding of the invention, the description will be directed, first, to the general organization of the circuits and their particular function. Secondly, the overall operation of a system of circuits embodying the present invention, as shown in block diagram form in FIG. 1, will be described. Finally, the detailed operation of the circuits incident to the reception, translation, impulsing, registration, and outpulsing of digital impulses will be described.

GENERAL DESCRIPTION OF THE CIRCUITS

Figure 1:
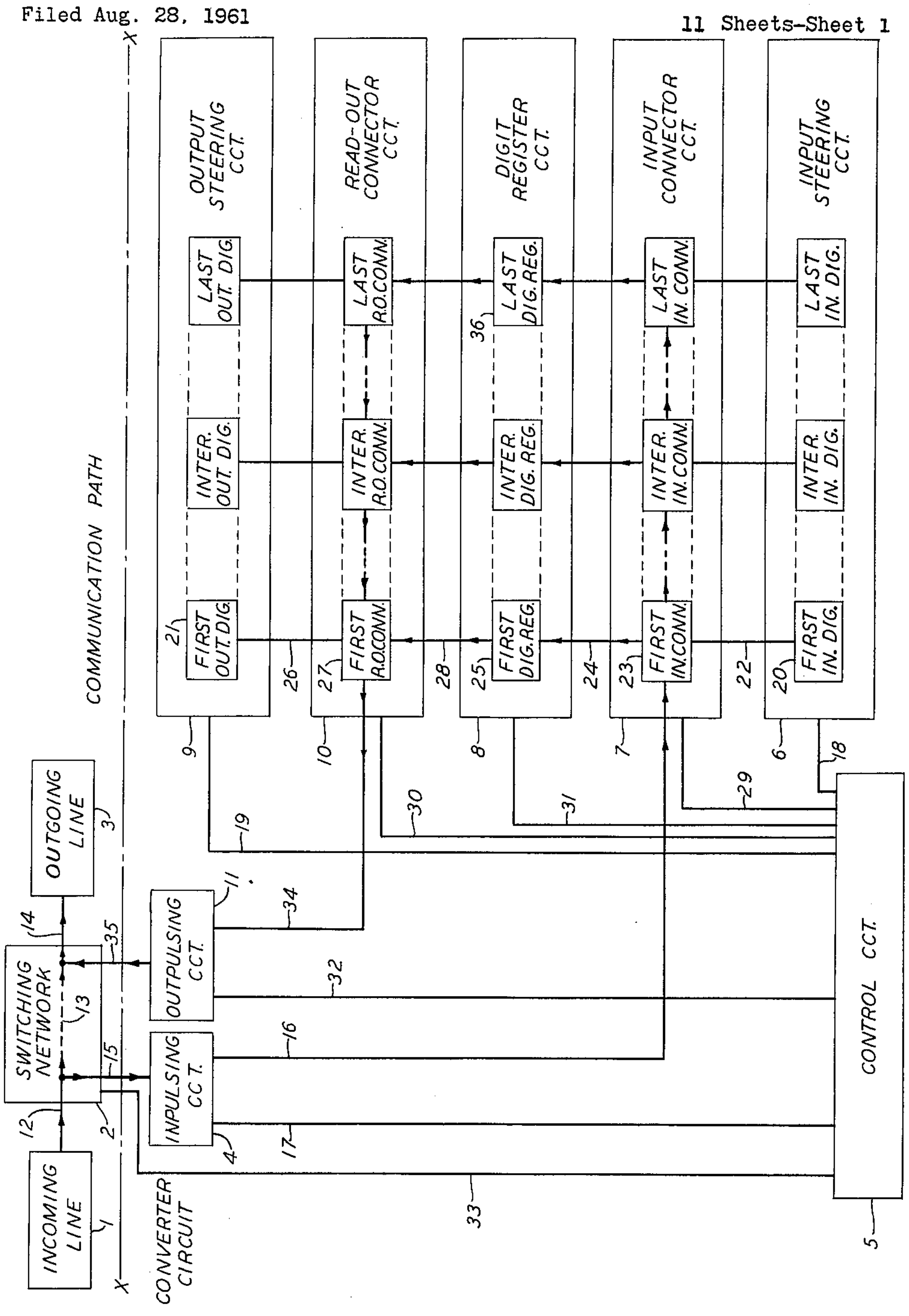

FIG. 1 indicates, in block diagram form, the principal circuit functions of a system embodying the instant invention and the inter-relation between the functions. That portion of FIG. 1 above the broken line X—X represents, in general, the communication path over which both communication and control signaling may be effected. That portion of FIG. 1 below the broken line X—X represents the converter circuit which receives multifrequency or TOUCH-TONE pulses, and translates, registers and outpulses equivalent D.C. pulses to control the establishment of an outgoing connection.

*Communication path*

The incoming line 1 represents a subscriber or customer line equipped with a multifrequency or TOUCH-TONE signaling device, together with a suitable central office termination for the line, which termination may be, for example, a well-known line finder of the type generally employed in step-by-step switching systems, such as disclosed in Patent 3,133,155 to F. C. Kuchas, of May 12, 1964. The switching network 2 represents a switching network for establishing a connection between an incoming line and an outgoing line, for effecting a connection from an incoming line via an "inpulsing" path, to the converter circuit, and for providing an "outpulsing" path from the converter circuit to an outgoing line. The switching network may be, for example, the well-known step-by-step type illustrated in the aforementioned Kuchas disclosure. The outgoing line 3 represents an outgoing line or trunk or other equipment of any suitable type, together with means for effecting a connection thereto. The outgoing line may be, for example, a first selector of a step-by-step system such as contemplated in the above-mentioned Kuchas disclosure.

*Converter circuit*

The inpulsing circuit 4 represents circuitry for receiving incoming multifrequency pulses, translating the multifrequency pulses to equivalent two-out-of-five codes, checking the validity of the received codes, and starting the operation of the related converter circuitry. The control circuit 5 represents circuitry for controlling the sequential operation of associated circuitry. The input steering circuit 6 represents circuitry for sequentially steering the consecutively received digits into the respective appropriate digit registers. The input connector circuit 7 represents circuitry for sequentially connecting the translated outputs of the inpulsing circuit 4 to the respective digit registers, one digit at a time. The digit register circuit 8 represents a multidigit register circuit for sequentially registering the received digits, one digit at a time. The output steering circuit 9 represents circuitry for sequentially steering out, in the order of their reception, the digits registered in the digit register circuit 8. The read-out connector circuit 10 represents circuitry for sequentially connecting the digital outputs of the digit register circuit 8 to the outpulsing circuit 11. The outpulsing circuit 11 represents circuitry for determining the rate at which outpulsing is to take place, for inserting interdigital intervals, and for transmitting the series of digital pulses corresponding to the digits read out of the digit register circuit 8, to the switching network 2 and, thence, to the outgoing line 3.

A telephone switching system employing circuitry for responding either to dial pulsing or to key pulsing, and for converting the received multifrequency key pulses into equivalent direct-current dial pulses for controlling a switching train, is disclosed in Patent 3,127,479 to W. B. Macurdy and H. E. Noweck of March 31, 1964.

GENERAL SYSTEM DESCRIPTION

*Direct-current pulsing*

Let it be assumed, for example, that the customer subset of incoming line 1 is equipped with a direct-current dialing device such, for example, as a conventional rotary telephone dial. Under this condition the direct-current pulses are transmitted via path 12, the path through the switching network 2 represented by the broken line 13, and path 14, to outgoing line 3, where the direct-current pulses are employed to control the establishment of a connection to the called line or station.

*Multifrequency pulsing*

Now let it be assumed, for example, that the customer subset of incoming line 1 is equipped with any one of a number of well-known multifrequency or TOUCH-TONE dialing or keying devices capable of transmitting selected frequency signals representative of dialed or keyed digits. When the customer originates a call, the incoming line 1 goes to an "off-hook" condition, thereby causing the switching network 2 to attach itself to, or "seize," the converter circuit. When the switching network 2 seizes a converter, a control signal is transmitted from the switching network, via path 33, to the control circuit 5, thereby starting the operation of the control circuit. As a result of the starting of the control circuit 5, a control signal is transmitted therefrom, via path 17, to the inpulsing circuit, thereby readying the inpulsing circuit for the reception of multifrequency pulses. Also, as a result of the starting of the control circuit 5, control signals are transmitted therefrom, via paths 18 and 19, respectively, to the input steering circuit 6 and to the output steering circuit 9, thereby operating the first input digit steering stage 20 and the first output digit steering stage 21. Also, as a further result of the starting of the control circuit 5, control signals are transmitted therefrom, via paths 29, 30, 31, and 32, respectively, to the input connector circuit 7, the read-out connector circuit 10, the digit register circuit 8, and the outpulsing circuit 11, thereby conditioning these circuits for operation. The operation of the first input steering stage 20 causes a control circuit to be established therefrom, via path 22, to the first input connector 23, thereby causing first input connector 23 to operate and complete a circuit therefrom, via path 24, to the input of the first digit register 25. Also, the operation of the first output steering stage 21 causes a control circuit to be established therefrom, via path 26, to the first read-out connector 27, thereby causing first read-out connector 27 to operate and complete a circuit therefrom, via path 28, to the output of first digit register 25.

The customer indicates the desired line or station number by manipulating the multifrequency dialing or keying device, thus causing the transmission of a series of pairs of frequencies, each such pair of frequencies uniquely corresponding to a "dialed" or "keyed" one of the digits 1 through 9 and 0. The pairs of digits are successively transmitted, via path 12, switching network 2, and path 15, to the inpulsing circuit 4. The inpulsing circuit 4 comprises a multifrequency receiving circuit such, for example, as disclosed in Patent 3,076,059 to L. A. Meacham and L. Schenker, issued January 29, 1963. Each such pair or combination of received frequencies is translated into equivalent two-out-of-five code signals, the combination is checked for validity, and if the received pair of frequencies is representative of a valid code combination the two-out-of-five code signals are successively transmitted from the inpulsing circuit 4, via path 16, to the input connector circuit 7.

The two-out-of-five code signal representing the first digit is transmitted, via path 16, the operated first input connector 23, and path 24, to the input of the first digit register 25, causing the first digit to be registered therein. Immediately following the registration of the first received digit in digit register 25, the digit is read therefrom, via path 28, the operated first read-out connector 27, and path 34, to the outpulsing circuit 11. The outpulsing circuit 11 comprises circuitry for generating direct-current pulses simulative of direct-current dial pulses, circuitry for counting the number of such pulses, circuitry for inserting an interdigital pause, and circuitry for outpulsing such pulses. When the two-out-of-five code corresponding to the first received digit is received by the outpulsing circuit 11 the outpulsing circuit generates and counts a number of direct-current pulses corresponding to the first received digit and transmits the generated and counted pulses, via path 35, switching network 2, and path 14, to the outgoing line 3.

It will be noted that for the first received digit, the first input connector 23 and the first output connector 27 are concurrently operated, thereby permitting the first received digit to read-in and read-out substantially at the same time. However, for subsequently received digits, the operation of corresponding successive input connectors and output connectors is asynchronous. This lack of read-in and read-out synchronism is due to the fact that the rate of inpulsing and the rate of outpulsing are under independent controls. The rate of inpulsing is controlled by the manual dexterity of the customer, or the rapidity with which he operates the dialing or keying mechanism to "dial" or "key" successivve digits; while the rate of outpulsing is predetermined by the circuit constants of the pulse generating means resident in the outpulsing circuit 11, and, hence, the rate of inpulsing may exceed the rate of outpulsing. Therefore, for subsequently received digits, the input steering circuit 6 and the input connector circuit 7 will cause such digits to be successively registered in the digit registers of digit register circuit 8 at the rate at which such digits are received,and for such subsequently received digits, the output steering circuit 9 and the read-out connector 10 will cause such digits to be successively read-out at the rate prescribed by the outpulsing circuit 11.

When the number of digts of a first sub-series of digits that have been received and registered are equal to the number of digit registers, the operation of the last digit register, the operation of the input steering circuit 6, and the operation of the input connector circuit 7 cause the recycling of the digit register circuit 8, thereby permitting additional subsequently received digits of a second sub-series to be sequentially registered in the digit registers previously used for the registration of the first sub-series of received digits after the corresponding digit of the first sub-series has been outpulsed.

The digit register circuit 8 comprises locking circuitry for the digit registers to ensure the locking up of a digit of the second sub-series even though a previously registered digit of the first sub-series in the next succeeding digit register has not yet been outpulsed. The output steering circuit 9 comprises circuitry for recognizing that the last digit of the second sub-series of digits is the last digit of a line or station designating code and, incident to such recognition, for effecting the disconnection of the converter from the switching network, and for causing the release of the converter circuitry.

DETAILED DESCRIPTION

An exemplary embodiment of the invention, having particular reference to FIGS. 3 through 13, will now be described.

*Origination of call*

Figure 3:
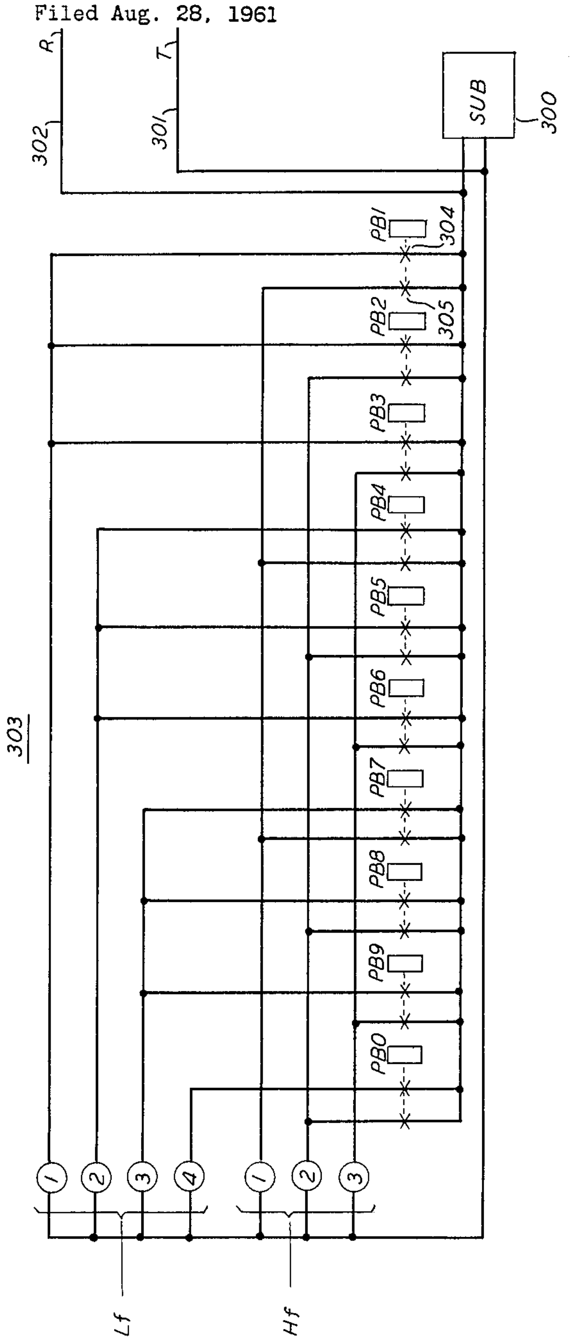
FIG. 3 shows a conventionalized customer or subscriber station set equipped with a multifrequency or TOUCH-TONE signaling device.
Figure 2:
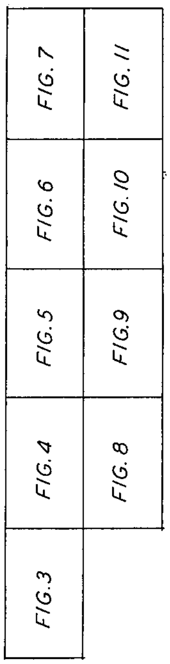
FIG. 2 illustrates the relative arrangement of FIGS. 3 through 11 of the drawings disclosing the invention in detail.

Referring to FIG. 3, when a call is originated by a customer or subscriber, the subscriber set 300, in its "off-hook" condition, causes the establishment of a direct-current bridge across the calling line T and R conductors 301 and 302, respectively, thereby causing the switching network 400 (FIG. 4) to establish a connection to the calling line.

Figure 4:
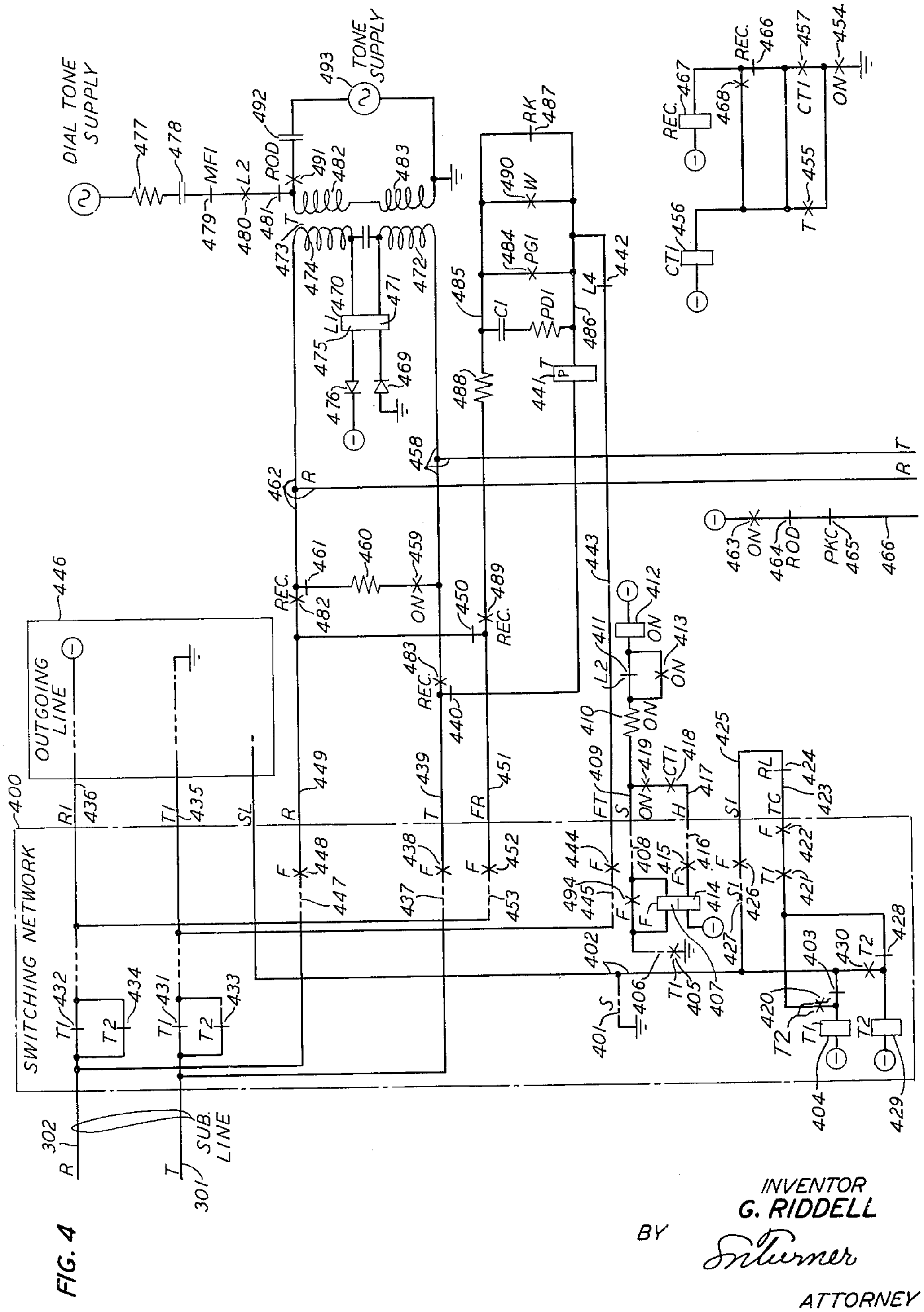
FIG. 4 shows a simplified switching network, together with supervisory, control, and outpulsing circuitry.
Figure 7:
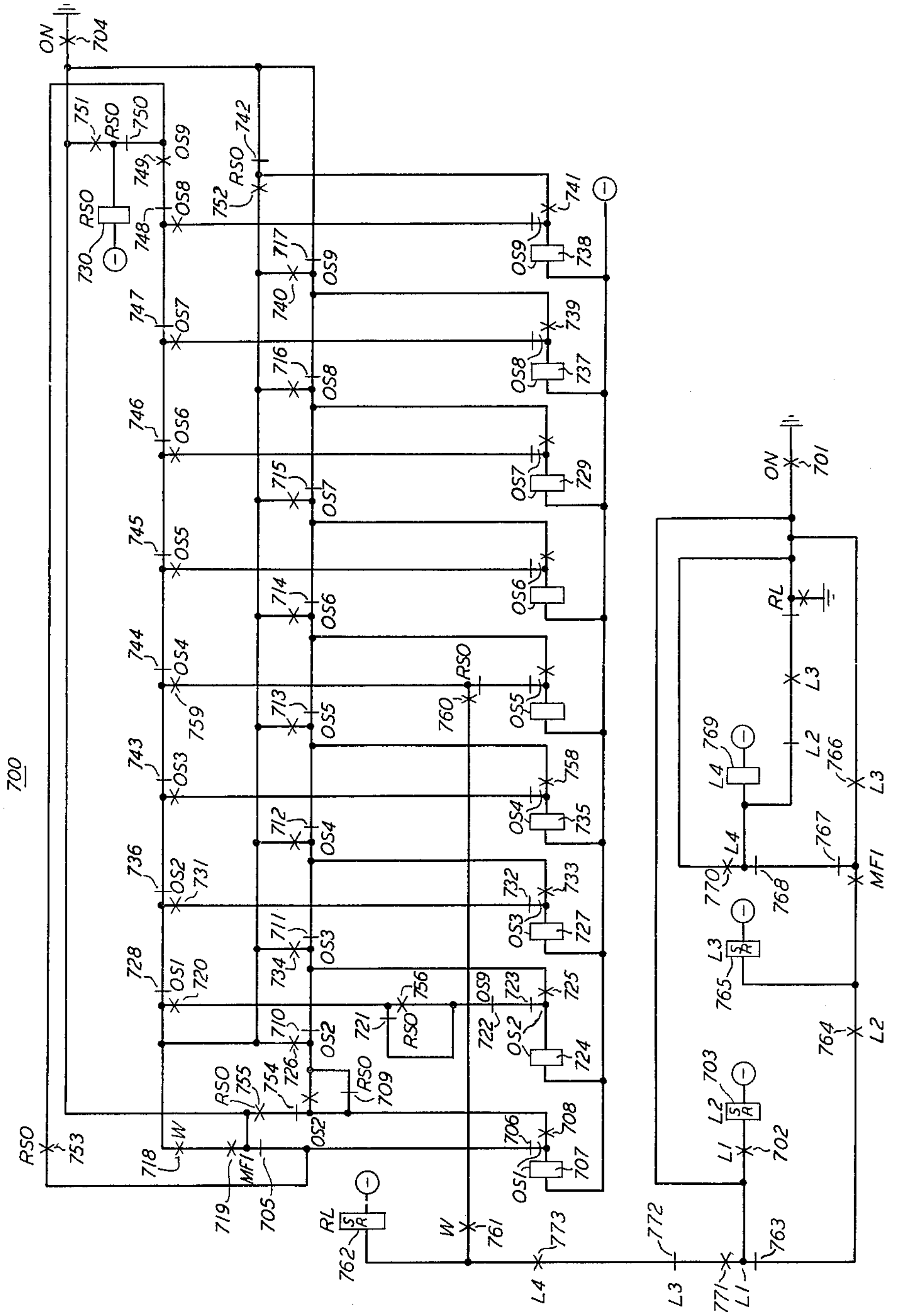
FIG. 7 shows output digit steering circuitry.

Referring now to FIG. 4, when the switching network 400 connects to the calling line, a ground is extended, via a path represented by broken line 401, to the sleeve conductor 402, and thence, through T2 relay contact 403, and T1 relay winding 404 to negative battery, causing relay T1 to operate. With relay T1 operated, ground is extended, via T1 relay contact 405, a sleeve wiper path represented by the broken line 406, F relay upper winding 407, a path represented by the broken line 408, sleeve conductor 409, resistor 410, L2 relay contact 411, and ON (off-normal) relay winding 412 to negative battery, causing relay ON 412 to operate and lock through ON relay contact 413 to its operating ground. Relay F operates through its energized upper winding 407. Relay T1 (404) locks up through T2 relay contact 420 and T1 relay contact 421, F relay contact 422, TC conductor 423, RL relay contact 424, S1 conductor 425, F relay contact 426, and an S1 sleeve wiper path represented by the broken line 427, to ground on the sleeve conductor 402. The closure of T1 relay contact 421 extends ground (from a previously-described path), via T2 relay contact 428 and the T2 relay winding 429, to negative battery, causing relay T2 429 to operate and lock up through T2 relay contact 430 to ground on sleeve conductor 402. With relays T1 (404) and T2 (429) operated, the T1 relay contacts 431 and 432, and the T2 relay contacts 433 and 434 are opened, thereby breaking the direct connection between T conductor 301 and T1 conductor 435, and the direct connection between R conductor 302 and the R1 conductor 436. Upon the energization of the F relay winding 407 and the operation of the F relay contacts, ground is extended from outgoing line 446, via T1 conductor 435, a switch wiper path represented by the broken line 445, F relay contact 444, FT conductor 443, L4 relay contact 442, T relay winding 441, REC relay contact 440, T conductor 439, F relay contact 438, a switch wiper path represented by broken line 437, T conductor 301, subset 300 (FIG. 3), R conductor 302, a switch wiper path represented by the broken line 447, F relay contact 448, R conductor 449, REC relay contact 450, FR conductor 451, F relay contact 452, a switch wiper path represented by the broken line 453, R1 conductor 436, to negative battery in outgoing line 446. Relay T (441) operates in the above-described circuit. Ground is extended through ON relay contact 454, T relay contact 455, and the winding of relay CT1 (456) to negative battery, causing relay CT1 456 to operate and lock up to ground through relay contacts ON 454 and CT1 457. The operation of relay CT1 456 completes a circuit whereby ground is extended from sleeve conductor S 409, via relay contacts ON 419, CT1 418, conductor H 417, a path represented by the broken line 416, relay contact F 415, and the lower F relay winding 414, to negative battery, thereby causing relay F to lock up through its lower winding. The upper winding 407 of relay F is now short-circuited by F relay contact 494. The operation of off-normal relay ON 412 completes a bridging path from conductor T 458, via contact ON 459, resistor 460 and contact REC 461 to conductor R 462. Ground is connected, via diode 469, the lower winding 471 of relay L1 470, the lower winding 472 of transformer T 473, conductor T 458, contact ON 459, resistor 460, contact REC 461, conductor R 462, the upper winding 474 of transformer T 473, the upper winding 475 of relay L1 470, and the diode 476, to negative battery, causing relay L1 470 to operate. Referring to FIG. 7, ground is extended, via relay contacts ON 701, L1 702, and the winding of slow-to-release relay L2 703, to negative battery, causing relay L2 703 to operate and, because of its slow-to-release characteristic, to remain operated until the completion of dialing of the first digit. Referring again to FIG. 4, dial tone is connected, via resistor 477, capacitor 478, relay contacts MF1 479, L2 480 and ROD 481, and the series-connected coils 482 and 483 of transformer T 473 to ground.

*Preparation of receiver circuit*

With the off-normal relay ON 412 operated, negative battery is extended, via relay contacts ON 463, ROD 464, and PKC 465, and conductor 466, to the multifrequency receiver circuit 800 and to the pulse repeating relays 801 (FIG. 8), to supply operating energy therefor. Ground is extended, via relay contacts ON 454, CT1 457, and REC 466, through the relay winding REC 467 to negative battery, causing the REC relay to operate and lock up to ground through relay contacts ON 454, CT1 457, and REC 468. With relay REC 467 operated, the bridging circuit is opened at continuity contact REC 461 and conductor R 449 is connected through continuity contact REC 482 to conductor R 462; at the same time the holding circuit for relay T 441 is opened at continuity contact REC 440 and conductor T 439 is connected through continuity contact REC 483 to conductor T 458; thus relay L1 470 remains operated under control of the calling customer line loop, relay T 441 is released, and a circuit is completed at relay contacts REC 482 and REC 483 to connect the input circuit of multifrequency receiver 800 (FIG. 8) to the customer line loop. Under this condition dial tone is inductively transmitted through transformer T 473, and via an obvious path, to the customer subset 300 (FIG. 3).

Again referring to FIG. 3, it has been assumed, for the purpose of explaining the exemplary embodiment of the instant invention, that the originating line indicated in FIG. 3 comprises a multifrequency dialing or keying device. However, to facilitate an understanding of the circuit operation when the originating line comprises a conventional direct-current dialing device in lieu of the multifrequency signaling device, let it be assumed, for example, that the customer station is equipped for direct-current dialing and that the customer has started to dial the number of the called line or station. Under this latter condition, the dialing of the first direct-current pulse opens the customer line loop circuit, thereby causing the line relay L1 470 (FIG. 4) to release, which, in turn, in a manner to be later described, causes the release of the converter and its disconnection from the customer line loop. The first, and succeeding direct-current dial pulses, are repeated directly through the switching network 400 to the outgoing line 446 in a manner well known in the art.

*Preparation for input digit steering*

Figure 6:
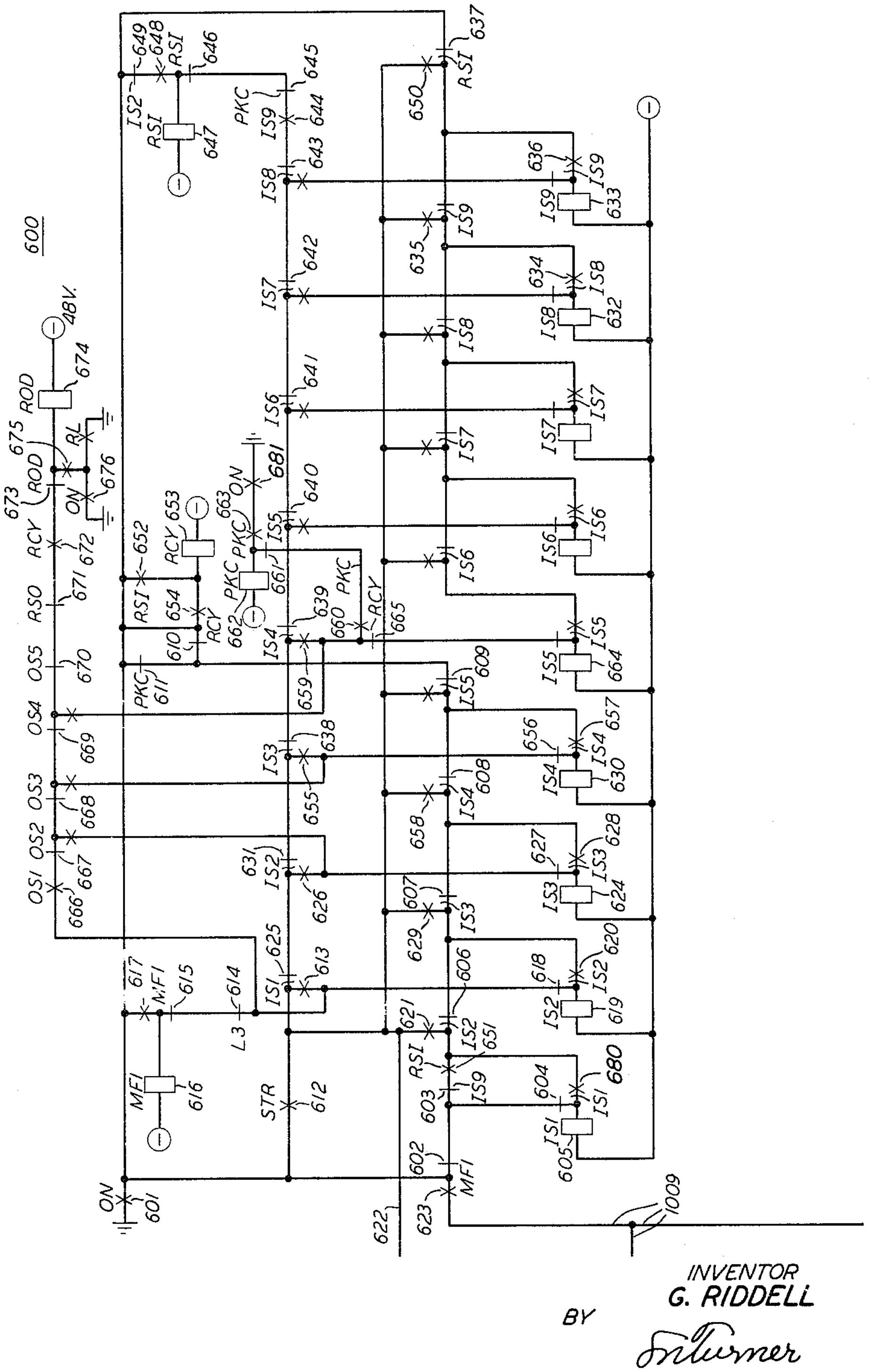
FIG. 6 shows input digit steering circuitry.
Figures 12, 13:
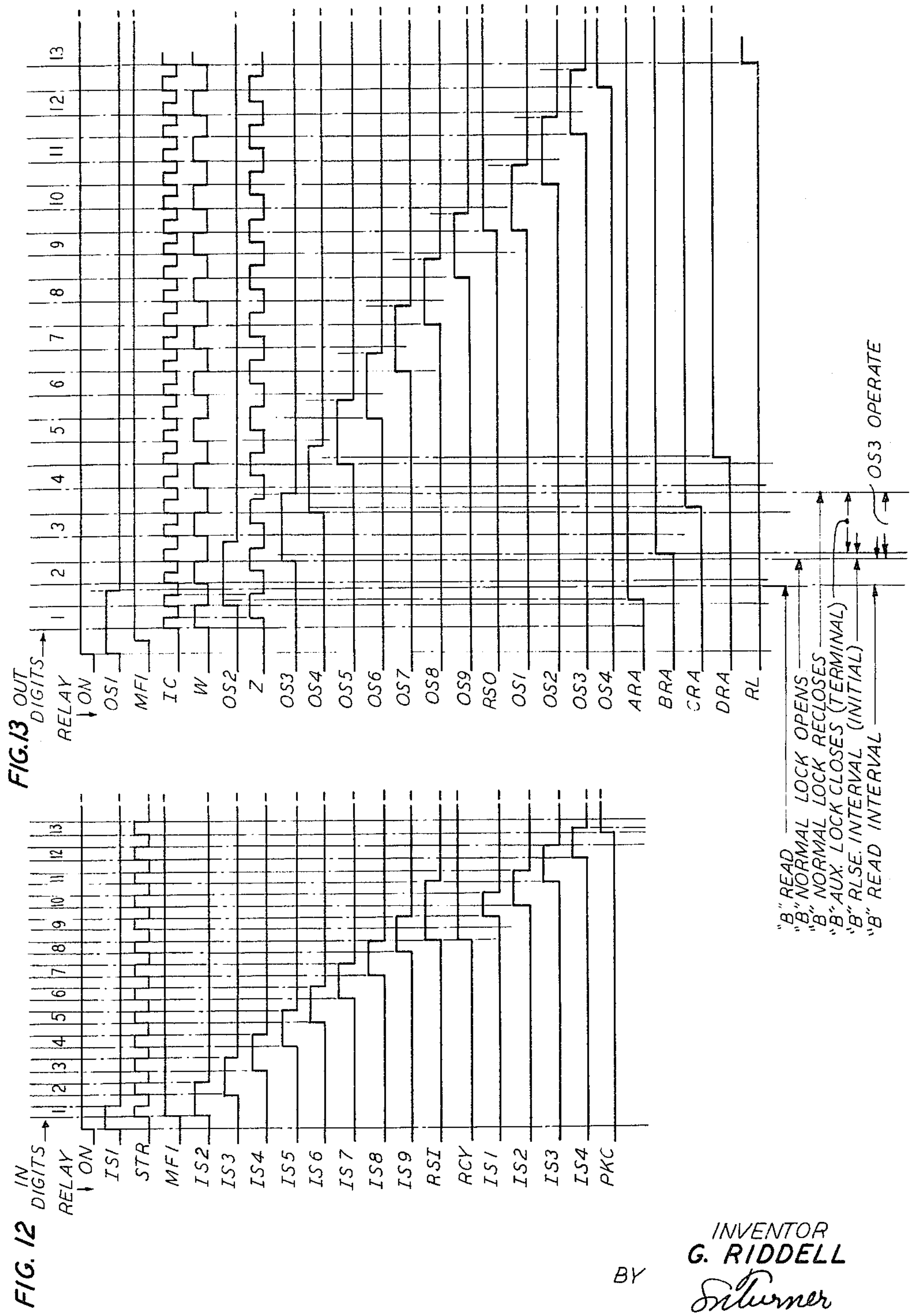

Referring now to FIGS. 6 and 12 in the input digit steering circuit 600, the closure of relay contact ON 601 extends ground, via multifrequency relay contact MF1 602, relay contact IS1 604, through the winding of relay IS1 605 to negative battery, causing relay IS1 605 to operate and lock up to ground through relay contacts IS1 680, IS2 606, IS3 607, IS4 608, IS5 609, the parallel-connected relay contacts RCY 610 and PKC 611, and relay contact ON 601. The input digit steering circuit 600 is now prepared for input steering.

*Preparation for output digit steering*

Referring now to FIGS. 7 and 13, in the output digit steering circuit 700, the closure of relay contact ON 704 extends ground, via multifrequency relay contact MF1 705, relay contact OS1 706, through the winding of relay OS1 707 to negative battery, causing relay OS1 707 to operate (providing that the multifrequency relay MF1 616 (FIG. 6) is in its released condition) and lock up to ground through relay contacts OS1 708, RS0 709, OS2 710, OS3 711, OS4 712, OS5 713, OS6 714, OS7 715, OS8 716, OS9 717, and ON 704. The output digit steering circuit 700 is now prepared for output steering.

*Multifrequency pulse keying*

Referring again to FIG. 3, a conventionalized multifrequency key pulsing arrangement is illustrated at 303. A plurality of low frequency sources designated L*f*1 through L*f*4, and a plurality of high frequency sources designated H*f*1 through H*f*3 are provided. A plurality of manually operable switching devices designated PB1 through PB9, and PB0 are provided which may, for example, be pushbutton keys. The operation of any pushbutton will cause the concurrent connection of a unique pair of frequencies, one from the "low" group and one from the "high" group, to the conductors 301 and 302, each such pair of frequencies respectively representing one of the numerical values 1 through 9, and 0. A typical arrangement of "low" and "high" pairs and their equivalent numercial values, such as may be obtained with the circuit disclosed in 303, is illustrated in the table below:

| Lf— | Hf— | Numerical Digit |
|---|---|---|
| 1 | 1 | 1 |
| 1 | 2 | 2 |
| 1 | 3 | 3 |
| 2 | 1 | 4 |
| 2 | 2 | 5 |
| 2 | 3 | 6 |
| 3 | 1 | 7 |
| 3 | 2 | 8 |
| 3 | 3 | 9 |
| 4 | 2 | 0 |

*Reception of multifrequency digits*

Figure 8:
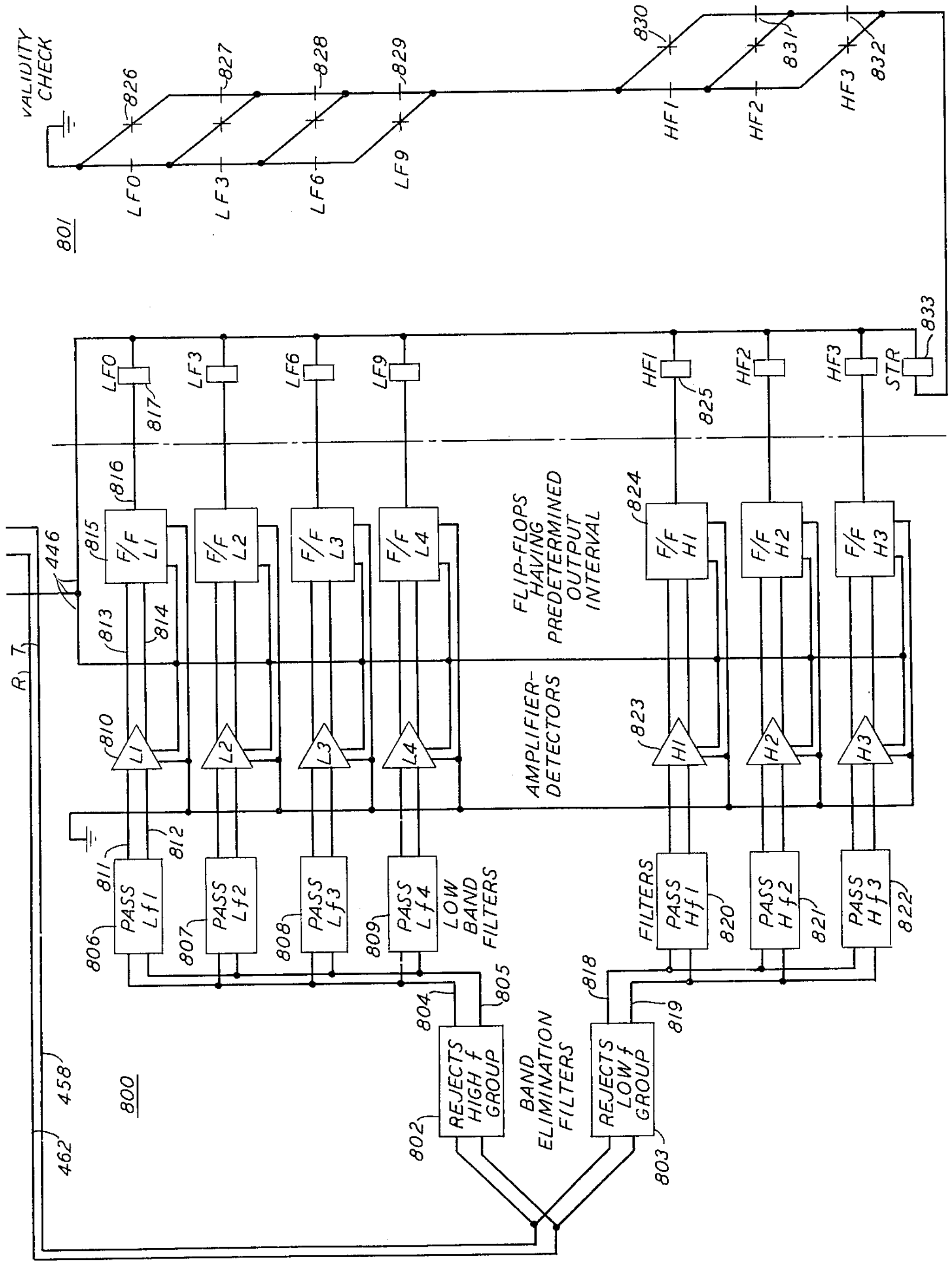
FIG. 8 shows multifrequency pulse receiver circuitry, and validity checking circuitry associated therewith.

Let is be assumed, for example, that the customer is originating a long distance call which will require the "keying" of thirteen digits, and that the first digit "keyed" is a "one." The operation of PB1 causes the concurrent closure of contacts 304 and 305, thereby causing the frequency sources L*f*1 and H*f*1 to be connected across the customer line loop conductors 301 and 302, and, thence, via switching network 400 (FIG. 4) and a previously-described path, and conductors 458 and 462, to the parallel-connected band elimination filters 802 and 803 of the multifrequency receiver circuit 800 (FIG. 8).

Referring to FIG. 8, the band elimination filter 802 passes the frequency L*f*1 (or any other selected one of the L*f*– group), but rejects the frequency H*f*1 (or any other selected one of the H*f*– group), and applies frequency L*f*1, via conductors 804 and 805, to the parallel-connected inputs of low band filters 806, 807, 808 and 809. Frequency L*f*1 is passed only through filter 806 and is impressed, via conductors 811 and 812, on the input of amplifier-detector L1 810 wherein frequency L*f*1 is amplified and rectified, and the direct-current component thereof is impressed, via conductors 813 and 814, on the input of the L1 flip-flop 815. The duration of the potential applied to the input of flip-flop 815 is short but is of sufficient duration to cause flip-flop 815 to become "turned on." With flip-flop 815 turned on, a positive-going potential appears on its output conductor 816 and is extended, via the winding of relay LF0 817, conductor 466, relay contacts PKC 465, ROD 464, and ON 463 (FIG. 4), to negative battery, causing relay LF0 817 to operate. The flip-flops such, for example, as 815 are characterized in that, when "turned on," the positive-going output potentials therefrom will persist for a predetermined "hangover" interval after the input potential thereto has ceased. Thus, the windings of the relay such, for example, as LF0 817 will remain energized for a time sufficient to ensure reliable circuit operation.

The band elimination filter 803 passes the frequency H*f*1 (or any other selected one of the H*f*– group), but rejects the frequency L*f*1 (or any other selected one of the L*f*– group), and applies frequency H*f*1, via conductors 818 and 819, to the parallel-connected inputs of high band filters 820, 821 and 822. In a manner similar to that described with respect to frequency L*f*1, the frequency H*f*1 is passed through filter H*f*1 820, is amplified and detected by amplifier-detector H1 823, causes the "turning on" of the H1 flip-flop 824 which, in turn, causes the operation of relay H*f*1 825.

Two of the multifrequency pulse repeating relays are now operated, LF0 817 for the "low" group, and HF1 825 for the "high" group, and these relays will remain operated for a predetermined period under the control of their respectively related flip-flop circuits. At this time, the validity check circuit 801 checks to ascertain whether or not the operated combination of multifrequency pulse repeating relays (i.e., LF0 817 and HF1 825) satisfies the requirement that one, and only one, relay in the "high" and "low" groups be operated, and that such combination of operated relays be a valid one. To complete the check, ground is extended, via relay contacts LF0 826, LF3 827, LF6 828, LF9 829, HF1 830, HF2 831 and HF3 832, and through the winding of the steering relay STR 833 to conductor 466, and via a previously- described path, to negative battery, causing relay STR 833 to operate and remain operated until the pulse repeating relays (i.e., LF0 817 and HF1 825) have released and opened up the validity check circuit.

*Identify Call as key-pulse*

Referring again to FIGS. 6 and 12 with the steering relay STR 833 operated, ground is extended, via relay contacts ON 601, STR 612, IS1 613, L3 614, MF1 615, and through the winding of relay MF1 616 to negative battery, causing relay MF1 616 to operate and lock up to ground through relay contacts MF1 617 and ON 601. The operation of relay MF1 616 identifies the instant call as being a multifrequency or TOUCH-TONE call. At this time, the ground extended through relay contacts ON 601, STR 612 and IS1 613 is also extended through relay contact IS2 618 and the winding of relay IS2 619 to negative battery, causing relay IS2 619 to operate and lock up to ground through relay contact IS2 620, via a previously-traced path, and relay contact ON 601. The operation of relay IS2 619, at continuity contact IS2 606, breaks the locking circuit for relay IS1 605 but, at continuity contact IS2 621, closes a substitute locking circuit for relay IS1 605 to ground through relay contacts STR 612 and ON 601. At this time, two of the input steering relays, IS1 605 and IS2 619, are concurrently operated and locked; but relay IS3 624 is prevented from operating at this time because the operating circuit therefor is broken at relay contact IS1 625.

*Multifrequency pulse repeating*

Figure 9:
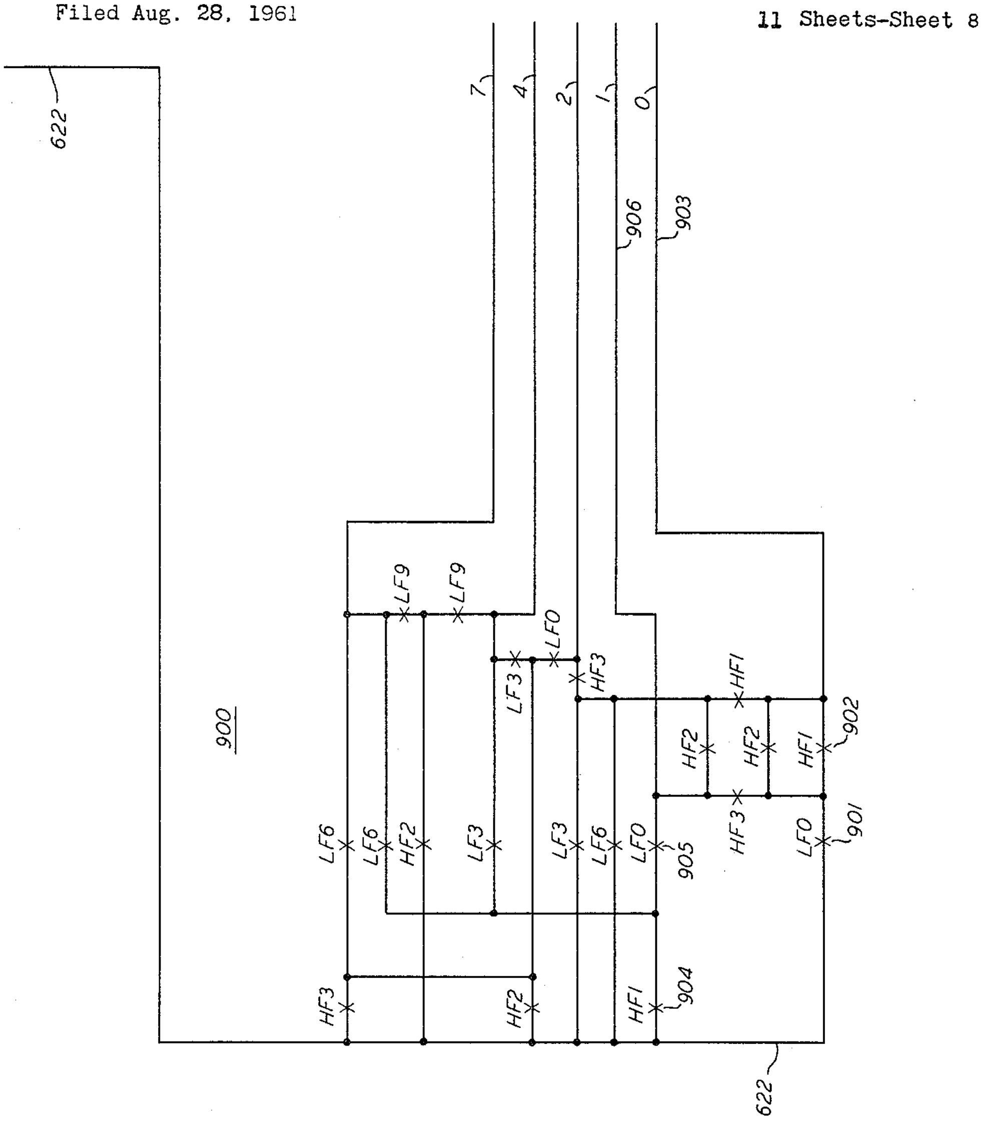
FIG. 9 shows multifrequency pulse repeating circuitry.

Referring now to FIG. 9, the multifrequency pulse repeating circuit 900 comprises a contact network consisting of the contacts of the pulse repeating relays 800 (FIG. 8); and wherein the operation of a "valid" pair of the pulse repeating relays causes the concurrent closure of two uniquely corresponding operating paths for the relays of a two-out-of-five digit register circuit. It will be remembered that it was assumed that the first multifrequency digit to be "keyed" was a "one" and that, as a result thereof, relays LF0 817, HF1 825, and STR 833 (FIG. 8) were operated. As a result thereof, the ground extended through relay contacts ON 601 and STR 612 (FIG. 6) is also extended, via conductor 622, to the multifrequency pulse repeating circuit 900 (FIG. 9). Ground from conductor 622 is extended, via relay contacts LF0 901, HF1 902, "zero" conductor 903, relay contact IS1 1001 (FIG. 10), conductor 1002, and the winding of digit register relay A0 1003 to negative battery, causing relay A0 1003 to lock up to ground through contact A0 1004, conductor 1010, switch arm 1005, switch contact 1006, relay contact OS2 1007, switch contact 1094, switch arm 1008, conductor 1009, and relay contacts MF1 623 (FIG. 6) and ON 601. Still referring to FIG. 9, at the same time, ground from conductor 622 is extended, via relay contacts HF1 904, LF0 905, "one" conductor 906, relay contact IS1 1011 (FIG. 10), conductor 1012, and the winding of digit register relay A1 1013 to negative battery, causing relay A1 1013 to lock up to ground through contact A1 1014, conductor 1010, and the path previously described with reference to relay A0 1003. Still referring to FIG. 9, it will be noted that the conductors 903 and 906 are the only ones via which ground is extended at this time.

*Setting of digit registers*

Figure 10:
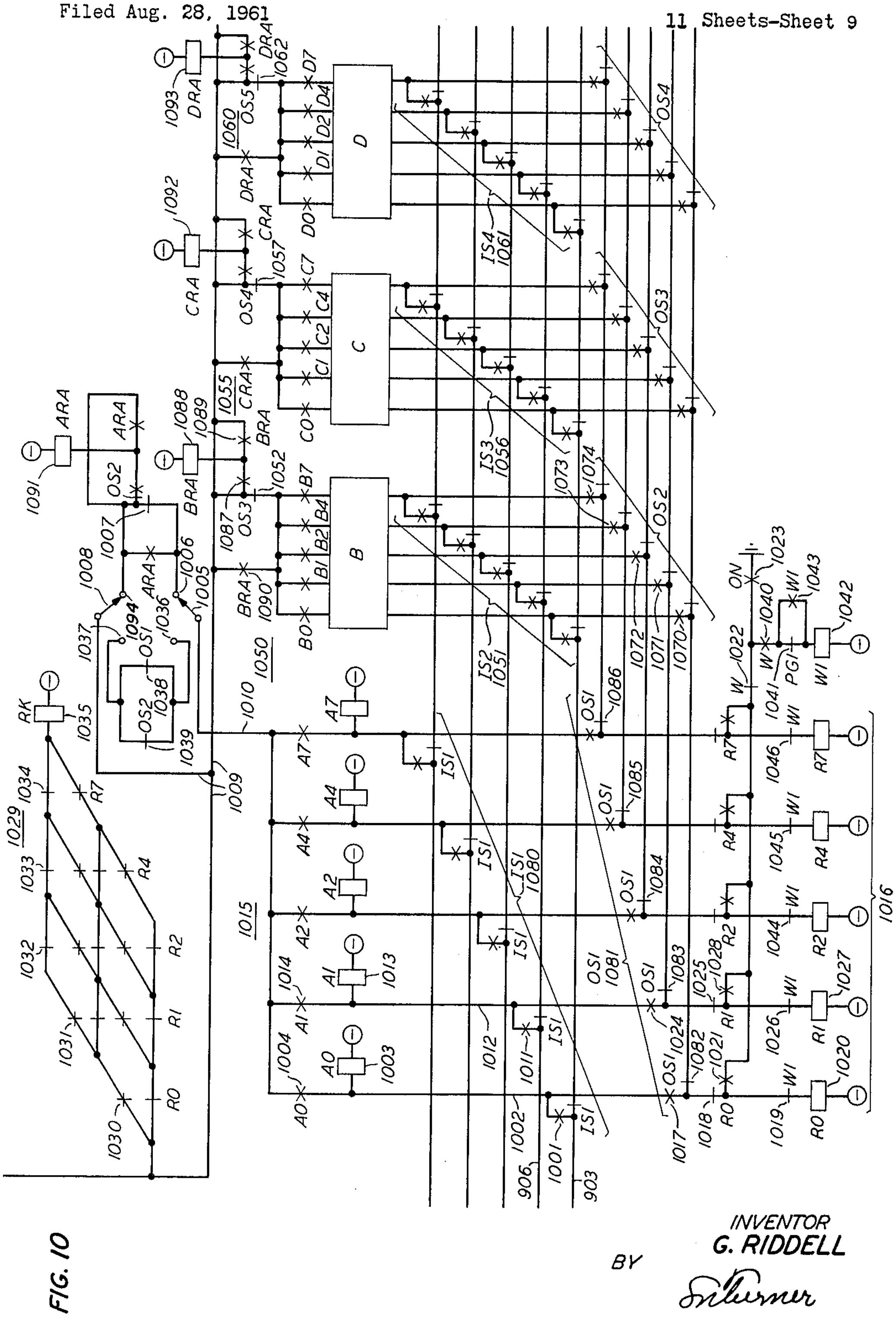

Referring now to FIG. 10, as has been described in the immediately preceding paragraph, the first multifrequency digit has caused operating grounds to be extended to the digit register relays A0 1003 and A1 1013, causing them to lock up to register the numerical value (i.e., "one") of the first digit in two-out-of-five code, and to remain locked up until the next succeeding digit shall have been registered in the next succeeding digit register and read out.

An optional locking path for the relays of the A– digit register 1015 may be provided by setting the switch arms 1005 and 1008 on their contacts 1036 and 1037, respectively. Under this condition, the locking up of the relays of the A– digit register is placed under the control of the parallel-connected relay contacts OS1 1038 and OS2 1039. The operation of the locking circuits for the digit registers will later be described in more detail.

*Reading out of registered digits*

Still referring to FIG. 10, it will be remembered that, at this time, relay OS1 (FIG. 7) of the output digit steering circuit 700 is in its operated condition, as previously described. Under this condition, the digit registered in the A– digit register 1015 will be read out by means of the recapture relays 1016 in the following manner. The ground extended to conductor 1002, via a previously-described path, is also extended, via relay contacts OS1 1017, R0 1018, and W1 1019, and the winding of recapture relay R0 1020 to negative battery, causing relay R0 1020 to operate and lock up to ground through relay contacts W1 1019, R0 1021, W 1022, and ON 1023. At the same time, the ground extended to conductor 1012, via a previously-described path, is also extended, via relay contacts OS1 1024, R1 1025, and W1 1026, and the winding of recapture relay R1 1027 to negative battery, causing relay R1 1027 to operate and lock up to ground through relay contacts W1 1026, R1 1028, W 1022, and ON 1023. The recapture relays 1016 are common to all of the digit registers of FIGS. 10 and 11, and are progressively and consecutively connectable thereto, one digit at a time, under the control of the output digit steering circuit of FIG. 7, to consecutively read out the consecutively received and registered digits.

*Two-out-of-five registration check*

Still referring to FIG. 10, the recapture relays 1016, by means of a two-out-of-five validity check circuit 1029, perform a validity check to ensure that for any digit read out from the digit registers the operated combination of recapture relays is significant of a valid two-out-of-five code. Thus, under the above-described condition, where, for example, relays R0 1020 and R0 1027 are operated, ground is extended via relay contacts ON 601 and MF1 623, conductor 1009 (FIG. 6), relay contacts R0 1030, R1 1031, R2 1032, R4 1033, and R7 1034, and the winding of the registration check relay RK 1035 to negative battery, causing relay RK 1035 to operate, thereby indicating the validity of the registered digit and starting the operation of the pulse generator circuit.

*Pulse generating*

Figure 5:
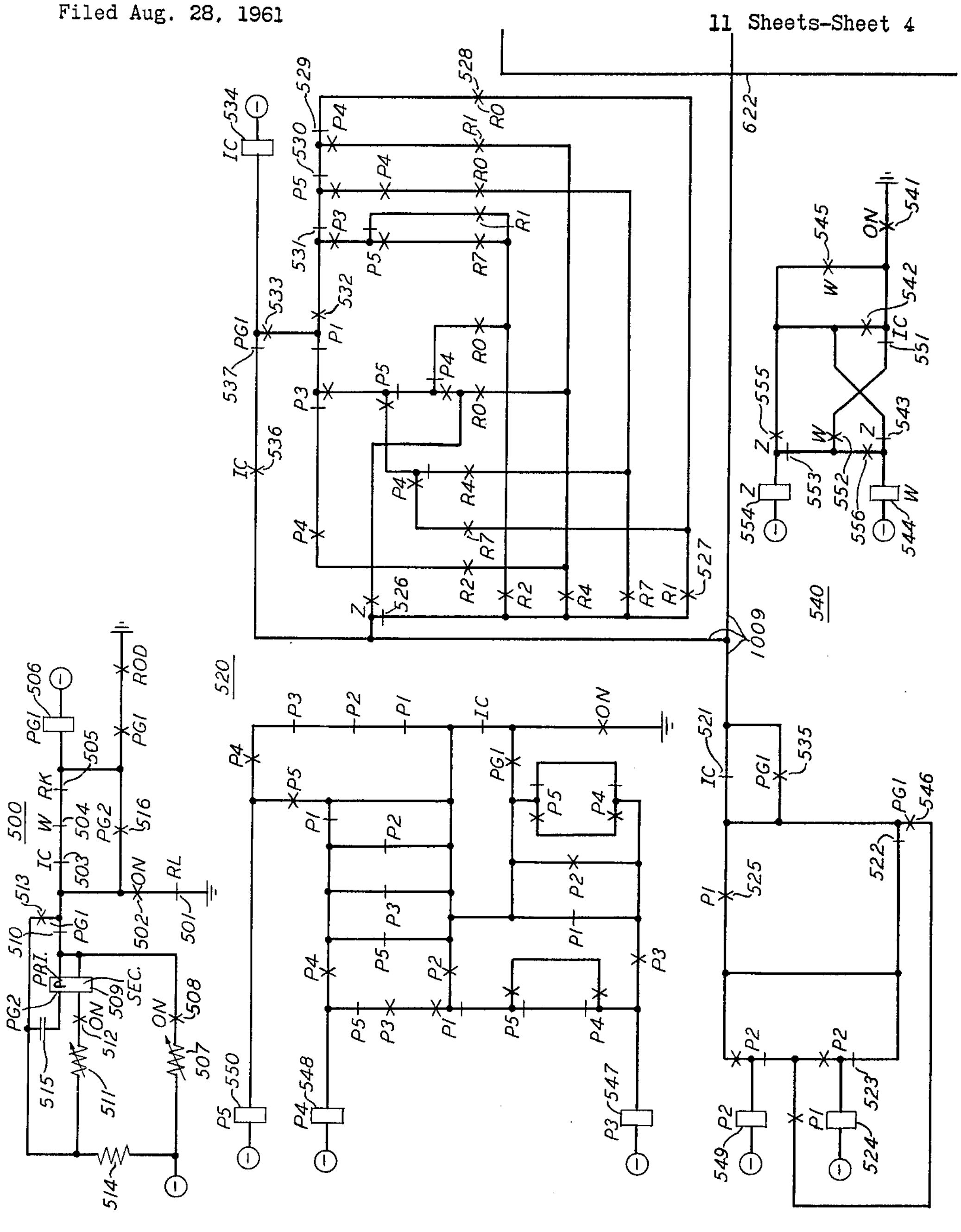
FIG. 5 shows outpulsing pulse generator, pulse counter, and control circuitry.

Referring now to FIG. 5, the operation of the dial pulse generator circuit 500 will be described. When the off-normal relay ON 412 (FIG. 4) operated in response to the seizure of the converter, as earlier described, ground was extended via an initial operating path for the pulse generating circuit comprising relay contacts RL 501, ON 502, IC 503, W 504 and KR 505, and the winding of relay PG1 506 to negative battery. At the same time, the ground extended through relay contact ON 502 was also extended through relay contact PG1 510 to the junction of the primary and secondary windings of polarized relay PG2 509. Also, at the same time, negative battery was connected through adjustable resistor 507 and relay contact ON 508 to the junction of the primary and secondary windings of relay PG2 509; and negative battery was also connected through resistor 514, adjustable resistor 511, relay contact ON 512, and the secondary winding of relay PG2 509 to the junction of its primary and secondary windings. Relay PG1 506 operated at that time, thereby opening contact PG1 510 and closing contact PG1 513, and causing ground to be extended, via relay contacts RL 501, ON 502 and PG1 513 to the capacitor 515. The capacitor 515 was charged by the current flowing through the path comprising the primary winding of relay PG2 509, relay contact ON 508 and resistor 507 to negative battery. The charging current flowing through the primary winding of relay PG2 509 was sufficient to operate it and to cause the movement of its armature to its front contacts, thus closing relay contact PG2 516 and providing an obvious parallel holding circuit for relay PG1 506. When the capacitor 515 became fully charged, current ceased to flow in the primary winding of relay PG2 509, and the differential effect of the current flow through its secondary winding caused the armature of relay PG2 509 to return to its back contact position, thus reopening contact PG2 516, but relay PG1 506 remains operated through its initial operating path.

Still referring to FIG. 5, with relay RK 1035 (FIG. 10) operated, as previously described, relay contact RK 505 breaks the initial operating circuit for relay PG1 506, causing relay PG1 506 to release and to reconnect off-normal ground, through relay contact PG1 510 to the junction of the primary and secondary windings of relay PG2 509. Capacitor 515 now discharges through the primary winding of relay PG2 509, thereby still maintaining the armature of relay PG2 509 in its back contact position, and still maintaining relay contact PG2

516 in its open position. When the capacitor 515 is fully discharged, the current flowing through the secondary winding of relay PG2 509 causes its armature to slow-release and move to its front contacts, thus reclosing relay contact PG2 516 and establishing an obvious circuit for the reoperation of relay PG1 506. The release-reoperate cycle of relay PG1 506 causes the generation and transmission of the first pulse. The release and reoperate (outpulsing) cycle of relay PG1 506, and the concomitant excursions of the armature of relay PG2 509, is repeated once for each outgoing direct-current pulse of each series of pulses corresponding to the received multifrequency digits. The rate of outpulsing is controlled by the resistance-capacity constants of the circuit (capacitor 515 and adjustable resistors 507 and 511). The number of outgoing pulses is counted by means of the dial pulse counting circuit 520, in a manner to be hereinafter explained.

*Pulse counting*

Still referring to FIG. 5, it will be remembered that it was assumed, for example, that the first multi-frequency digit received was a "one," resulting in the operation and locking of recapture relays R0 1020 and R1 1027 (FIG. 10). With relays ON 412 (FIG. 4) and MF1 616 (FIG. 6) operated, and with relay PG1 506 released, ground is extended, via relay contacts ON 601 and MF1 623, conductor 1009 (FIG. 6), relay contacts IC 521, PG1 522, and P2 523, and the winding of pulse counting relay P1 524 to negative battery, causing relay P1 524 to operate and lock up through relay contacts P2 523, P1 525, and IC 521, to ground supplied via conductor 1009. When relay PG1, 506 reoperates, and with recapture relays R0 1020 and R1 1027 operated (FIG. 10), the ground supplied via conductor 1009 is extended, via relay contacts Z 526, R1 527, R0 528, P4 529, P5 530, P3 531, P1 532, and PG1 533, and the winding of the interdigital timing control relay IC 534, to negative battery, causing relay IC 534 to operate. When relay PG1 506 releases, relay IC 534 locks up to ground through relay contacts PG1 537 and IC 536 to ground supplied via conductor 1009. With relay IC 534 operated, its contact IC 521 is opened, but the parallel-connected relay contact PG1 535 maintains a holding circuit for relay P1 524. The operation of relay IC 534 also, at its contact IC 503, opens the initial operating circuit for relay PG1 506. The next cyclic operation of relay PG1 506 opens the relay contact PG1 522, thereby unlocking relay P1 524 and causing it to release; and, at this time, the opening of contact PG1 537 opens the locking circuit for relay IC 534, causing it to release. The pulse counting circuit 520 has now counted one pulse, thereby satisfying the requirement of the operated combination of recapture relays (i.e., R0 1020 and R0 1027). Successively received digits will be registered and counted by the pulse counting circuit in a similar manner.

*Interdigital pulses*

The duration of the interval between the outpulsing of successive digits also is controlled, in a like manner, by the pulse counting circuit 500. Each interdigital interval has a duration equivalent to four dial pulses, and the determination of the duration of the interdigital interval is predicated on the operation of pulse counting relays P3 547 and P4 548, and the nonoperation of pulse counting relays P1 524, P2 549, and P5 550. During the interdigital interval, the relay contact PG1 484 (FIG. 4) will open a number of times, but the pulses generated thereby will be suppressed by means of the parallel-connected relay contacts W 490 (FIG. 4), as will hereinafter be explained.

*Transmission of pulses to outgoing line*

Again referring to FIG. 4, when the off-normal relay ON 412 operated and, in turn, caused the operation of pulse generating relay PG1 506 (FIG. 5), as previously described, the closure of contact PG1 484 connected the conductors 485 and 486. When the registration check relay RK 1035 (FIG. 10) operated to start the pulse generating cycle, as previously described, the opening of its contact RK 487 removed a connection across conductors 485 and 486. The cyclic operation of pulse generating relay PG1 506 (FIG. 5) causes its contacts PG1 484 to open and close once for each of the direct-current pulses generated by the pulse generating circuit 500, and counted by the pulse counting circuit 520. The path whereby the outgoing pulses are transmitted comprises: conductor T1 435, switch wiper path represented by broken line 445, relay contact F 444, conductor FT 443, relay contact L4 442, conductor 486, relay contact PG1 484, conductor 485, resistor 488, relay contact REC 489, conductor FR 451, relay contact F 452, switch wiper path represented by broken line 453, and conductor R1 436.

*Interdigital control*

Again referring to FIG. 5, during the interval between the release of pulse generating relay PG1 506 and its subsequent cyclic reoperation, the ground extended via conductor 1009 is also extended, via relay contacts IC 536 and PG1 537, and the winding of interdigital timing control relay IC 534 to negative battery, causing relay IC 534 to be held in its operated condition. The interdigital control circuit 540 now operates in the following manner: Ground is extended, via off-normal relay contact ON 541, relay contact IC 542, relay contact Z 543, and the winding of the out-digit steering control relay W 544 to negative battery, causing relay W 544 to operate and lock up to off-normal ground through relay contacts Z 543, W 545, and ON 541.

*Release of recapture relays*

Again referring to FIG. 10, the operation of relay W 544 (FIG. 5), at contact W 1022, opens the locking circuit for the recapture relays 1016 and causes the operated relays thereof (i.e., R0 1020 and R0 1027) to release; at this time ground is extended, via relay contacts ON 1023, W 1040 and PG1 1041, and the winding of the interdigital auxiliary relay W1 1042 to negative battery, causing relay W1 1042 to operate and lock up to ground through relay contacts W1 1043, W 1040, and ON 1923; also, at this time, relay contact W 490 (FIG. 4) closes a parellel-connected path across relay contacts PG1 484 and RK 487, thereby suppressing the dial pulses generated during the interdigital interval; also, at this time, the closure of relay contact W 718 (FIG. 7) completes a path for effecting the advance of the output digit steering circuit 700 (FIG. 7), the significance of which will hereinafter be described in detail.

The operation of relay W1 1042, as above described, at relay contacts W1 1019, W1 1026, W1 1044, W1 1045, and W1 1046, opens the operating circuit for the recapture relays 1016, thereby precluding their further operation until the succeeding digit is to be read out. The release of the operated valid combination of recapture relays (i.e., R0 1020 and R0 1027) opens the operating circuit for validity check relay RK 1035, causing relay RK 1035 to release, thereby reclosing relay contact RK 505 (FIG. 5) and partially preparing a circuit for the reoperation of pulse generating relay PG1 506 (FIG. 5).

Again referring to FIG. 5, the next cyclic operation of pulse generating relay PG1 506, at contact PG1 537, opens the holding circuit for relay IC 534, causing relay IC 534 to release, thereby reclosing relay contact IC 503 and partially preparing a circuit for the reoperation of relay PG1 506.

*Interdigital timing control*

With interdigital timing control relay IC 534 released, and with relay W 544 operated, ground is extended, via relay contacts ON 541, IC 551, W 552, Z 553, and the winding of interdigital control interval relay Z 554 to negative battery, causing relay Z 554 to operate and lock up to ground through relay contacts Z 555, W 545, and ON 541. At this time, relay W 544 remains locked up through a substitute locking path through relay contacts Z 556, W 552, IC 551, and ON 541. The relays W 544 and Z 554 will remain locked up under the control of relay contact IC 51 until the termination of the interdigital interval.

*Input digit steering*

Again referring to FIG. 3, it is assumed that the customer will proceed to "key" the remaining twelve digits required to place his call, thereby transmitting successive pairs of frequencies, in the manner previously described.

Again referring to FIG. 8, it will be remembered that the flip-flops (e.g. 815 and 824) have a finite "hangover" time for each received multifrequency pulse, after which they revert to their "turned-off" state, thereby releasing the operated pulse repeating relays (e.g. LF0 817 and HF1 825), and thereby causing the release of the steering relay STR 833. Thus, the steering relay STR 833 will perform one operate-release cycle for each received multifrequency pulse, and at a rate solely determined by the rapidity with which the customer operates the pulsing keys.

Again referring to FIGS 6, and 12 when the steering relay STR 833 (FIG. 8) releases, following the reception and registration of the first multifrequency digit, the locking circuit for relay IS1 605 is opened at relay contact STR 612, causing relay IS1 605 to release. When the second multifrequency digit is received and checked, a pair of pulse repeating relays are operated, one in the LF– group, and one in the HF– group; and assuming a valid combination, the steering relay STR 833 (FIG. 8) is reoperated, in the manner previously described. With relay STR 833 (FIG. 8) operated the second time, ground is extended, via relay contacts ON 601, STR 612, IS1 625, IS2 626 and IS3 627, and the winding of relay OS3 624, to negative battery, causing relay IS3 624 to operate and lock up to ground through relay contact IS3 628, via a previously described path, and relay contact ON 601. The operation of relay IS3 624, at continuity contact IS3 607, breaks the locking circuit for relay IS2 619 but, at continuity contact IS3 629, closes a substitute locking circuit for relay IS2 619 to ground through relay contacts STR 612 and ON 601. At this time, two of the input steering relays IS2 619 and IS3 624, are concurrently operated and locked; but relay IS4 630 is prevented from operating at this time because the operating circuit therefor is broken at relay contact IS2 631. When the steering relay STR 833 (FIG. 8) again releases, following the reception and registration of the second multifrequency digit, the locking circuit for relay IS2 619 is opened at relay contact STR 612, causing relay IS2 619 to release. Thus, for each successively received multifrequency digit, the IS– relays are successively operated; each operated IS– relay, in turn, closing an operating path for the next succeeding IS– relay; so that, for each incoming digit, two consecutive IS– relays are operated; but, for each digit, the locking path of the first of a pair of operated IS– relays is opened at the same time that the operating path for the next succeeding IS– relay is closed.

Referring now to the sequence chart of FIG. 12, and having in mind the foregoing description, it is apparent that there is a very definite pattern or rhythm in the operation of the IS– relays of the input digit steering circuit 600.

Referring now to FIGS. 6 and 12, the obove-described cycle of operation continues until the eighth multifrequency digit has been received. At this time relays IS8 632 and IS9 633 are concurrently operated. Relay IS8 632 is locked up to ground through relay contacts IS8 634, IS9 635, STR 612, and ON 601. Relay IS9 633 is locked up to ground through relay contacts IS9 636, RSI 637, and ON 601. Upon the cessation of the eighth pulse, relay STR 833 (FIG. 8) releases, thereby opening the locking circuit for relay IS8 632 which then releases. When the ninth multifrequency digit is received, ground is extended, via relay contacts ON 601, STR 612, IS1 625, IS2 631, IS3 638, IS4 639, IS5 640, IS6 641, IS7 642, IS8 643, IS9 644, PCK 645, and RSI 646, and the winding recycle "in" relay RSI 647, to negative battery causing relay RSI 647 to operate and lock up to ground through relay contacts RSI 648, IS2 649, and ON 601. The operation of relay RSI 647, at continuity contact RSI 650, completes a substitute locking path for relay IS9 633, under the control of ground via relay contact STR 612. At this time, all of the nine digits of the first subseries have been received and registered, and the input digit steering circuit is in readiness for the reception of the tenth digit or the first digit of the second subseries.

Referring again to FIG. 10, the operation, locking, and release of the digit register circuit 1015 was previously described in detail. The digit register circuits 1050, 1055, and 1060 operate in a similar manner, under the control of the respectively associated input steering connector relay contacts IS2 1051, IS3 1056, and IS4 1061.

Figure 11:
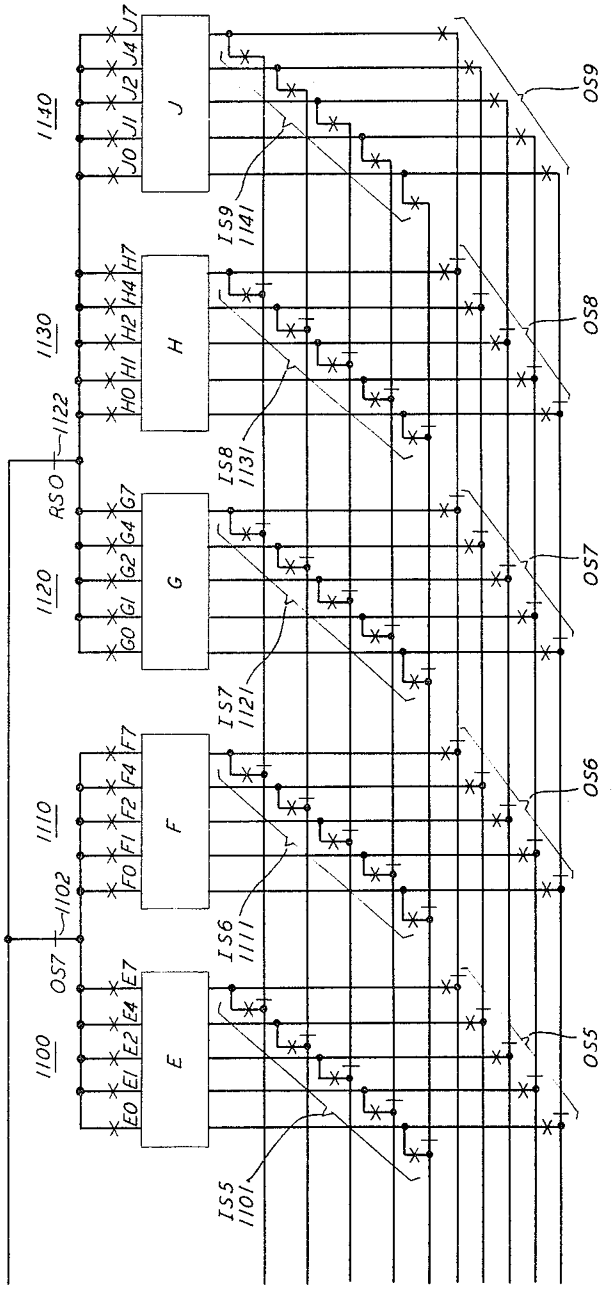

Referring now to FIG. 11, the digit register circuits 1100, 1110, 1120, 1130, and 1140 operate in a manner similar to that described with reference to digit register 1015 (FIG. 10), under the control of the respectively associated input steering connector relay contacts IS5 1101, IS6 1111, IS7 1121, IS8 1131, and IS9 1141.

It will be borne in mind that, up to this point, the circuits have been employed for the reception and registration of the first subseries of received multi-frequency digits; and that prior to the reception of the first digit of the first subseries, all of the digit registers were in their released or vacant state; and, hence, except for the first digit register, the output digit steering circuit was not yet prepared for reading out from the digit registers.

*Locking circuits for digit registers*

Reverting now to FIG. 10, it will be noted that the locking circuit for digit register circuit 1015 normally is under the control of a normally closed contact (i.e. OS2 1007 or, optionally, OS2 1039) controlled by the output digit steering relay OS2 724 (FIG. 7) associated with the next succeeding digit register circuit 1050. Similarly, the locking circuits for the digit register circuits 1050, 1055, and 1060 normally are respectively under the control of the normally closed contacts OS3 1052 OS4 1057, and OS5 1062, respectively associated with the respective next succeeding digit register circuits 1055, 1060, and 1100 (FIG. 11). The significance of such an arrangement of the normal locking paths is that an incoming digit cannot be read in and locked up in any of the digit registers 1015, 1050, 1055, or 1060 while a previously stored digit is being read out of its respective next succeeding digit register.

Referring again to FIG. 11, it will be noted that the locking circuit for digit register circuits 1100 and 1110 is under the common control of the normally closed contact OS7 1102 controlled by the output digit steering relay OS7 729 (FIG. 7); also, the locking circuit for digit register circuits 1120, 1130, and 1140 is under the common control of relay contact RSO 1122 controlled by the operation of the output recycle relay RSO 730 (FIG. 7). This arrangement signifies that a digit cannot be read into, or locked up in digit register circuits 1100 or 1110 while a previously stored digit is being read out of digit register 1120; also, a digit cannot be read in and locked up in digit register circuits 1120, 1130, or 1140 after the output digit steering circuit 700 (FIG. 7) has reached a recycle condition incident to the reading out of a previously stored ninth digit.

Reverting again to FIG. 10, it will be remembered that, as previously described, the customer may "key" the several digits as rapidly as he chooses; and, hence, the steering relay STR 833 (FIG. 8) operates and releases once for each received digit, causing the input digit steering relays to advance in synchronism with the received digits.

Therefore, it is apparent that, for the first subseries of nine digits, the digit register circuits will be operated and locked up as rapidly as the digits are received. This, it must be understood, is because the digit register circuits are vacant at this time. However, the rate of outpulsing, and hence the rate of reading out, is controlled at a rate predetermined by the resistance-capacity constants of pulse generating circuitry 500 (FIG. 5), as previously described. Because of the difference between the rate of inpulsing and the rate of outpulsing, it is possible that the pulses may be received faster than they can be outpulsed. This, as pointed out above, poses no problem when the nine digits of the first subseries are being received because, at this time, all of the digit register circuits are vacant. It will also be remembered that the first received digit was registered in digit register 1015, and was checked and read out, but digit register 1015 is still locked up.

Again referring to FIGS. 7 and 13, with relay W 544 (FIG. 5) operated, incident to outpulsing the first digit, as previously described, ground is extended, via relay contacts ON 704, MF1 719, W 718, OS1 720, RS0 721, OS9 722 and OS2 723, and the winding of relay OS2 724, to negative battery, causing relay OS2 724 to operate and lock up to ground through relay contacts 0S2 725, OS3 711, OS4 712, OS5 713, OS6 714, OS7 715, OS8 716, OS9 717, and ON 704. The operation of relay OS2 724, at continuity contact OS2 726, closes a substitute locking path for previously operated relay OS1 707, causing relay OS1 707 to remain locked up to ground through a new locking path comprising relay contacts OS1 708, RS0 709, OS2 726, W 718, MF1 719, and ON 704. At this time, two of the output steering relays, OS1 707 and OS2 724 are concurrently operated and locked; but relay OS3 727 is prevented from operating at this time because the operating circuit therefor is broken at relay contact OS1 728.

*Register connector advance*

Referring again to FIG. 10, when relay OS2 724 (FIG. 7) operates, the locking circuit or digit register circuit 1015 is opened at relay contact OS2 1007, causing digit register 1015 to release; also, the operation of relay OS2 724 causes the closure of the output steering connector relay contacts OS2 1070, OS2 1071, OS2 1072, OS2 1073, and OS2 1074, thereby preparing a path for connecting recapture relays 1016 to the digit register circuit 1050.

Agains referring to FIG. 5, at the termination of the interdigital count, relay IC 534 again operates, opening relay contact IC 551 and causing relay W 544 to release. Relay Z 554 remains locked up to ground under control of relay contact IC 542. Reverting again to FIGS. 7 and 13, the release of relay W 544, incident to completing the outpulsing of the first digit and during the ensuing interdigital interval, at relay contact W 718, opens the locking circuit for relay OS1 707, causing relay OS1 707 to release. Again referring to FIG. 5, when relay IC 534 again releases, the locking circuit for relay Z 554, is opened at contact IC 542, causing relay Z 554 to release. When relay IC 534 again operates in the manner previously described, the operating circuit for relay W 544 is again closed at contact IC 542, causing relay W 544 to again operate and lock up in the manner previously described.

Again referring to FIGS. 7 and 13, the reoperation of relay W 544 (FIG. 5), incident to outpulsing the second digit, at its contact W 718 completes a circuit whereby ground is extended, via relay contacts ON 704, MF1 719, W 718, OS1 728, OS2 731, and OS3 732, and the winding of relay OS3 727, to negative battery, causing relay OS3 727 to operate and lock up to ground through relay contacts OS3 733, via a previously described path, and relay contact ON 704. The operation of relay OS3 727, at continuity contact OS3 734, closes a substitute locking path for previously operated relay OS2 724, causing relay OS2 724 to remain locked up to ground through relay contacts OS2 725, OS3 734, W 718, MF1 719, and ON 704. At this time, two of the output steering relays OS2 724 and OS3 727 are concurrently operated and locked; but relay OS4 735 is prevented from operating at this time because the operating circuit therefor is broken at relay contact OS2 736. Thus, for each second operation and release of the interdigital timing control relay IC 534 the output steering control relay W 544 will operate and release once; and for each successive operation and release of relay W 544, the OS– relays are successively operated; each operated OS– relay, in turn, closing an operating path for the next succeeding OS– relay; so that, for each outgoing digit, two consecutive OS– relays are operated; but for each digit, the locking path of the first of a pair of operated OS– relays is opened at the same time that the operating path for the next succeeding OS– relay is closed.

Referring now to the sequence chart of FIG. 13, and having in mind the foregoing description, it is apparent that (as in the case of the input digit steering relays) there is a very definite pattern or rhythm in the operation of the OS– relays of the output digit steering circuit 700.

Referring now to FIGS. 7 and 13, the above-described cycle of operation continues until the eighth digit has been outpulsed. At this time relays OS8 737 and OS9 738 are concurrently operated. Relay OS8 737 is locked up to ground through relay contacts OS8 739, OS9 740, W 718, MF1 719, and ON 704. Relay OS9 738 is locked up to ground through relay contacts OS9 741, RS0 742, and ON 704. When relay W 544 (FIG. 5) again releases, incident to completing the outpulsing of the eighth digit and during the ensuing interdigital interval, as previously described, the locking circuit for relay OS8 737 is opened at relay contact W 718, causing relay OS8 737 to release. When relay W 544 (FIG. 5) again operates, to effect the outpulsing of the ninth digit, ground is extended, via relay contacts ON 704, MF1 719, W 718, OS1, 728, OS2 736, OS3 743, OS4 744, OS5 745, OS6 746, OS7, 747, OS8, 748, OS9 749, and RS0 750, and the winding of recycle "out" relay RSO 730, to negative battery, causing relay RSO 730 to operate and lock up to ground through relay contacts RS0 751 and ON 704. The operation of relay RSO 730, at continuity contact RS0 752, completes a substitute locking path for relay OS9 738, under the control of ground via relay contact W 718. At this time, all of the nine digits of the first subseries have been received and registered, and have been or are now being outpulsed, and the output digit steering circuit is in readiness for the signal to outpulse the tenth digit or the first digit of the second subseries.

Referring again to FIGS. 10 and 11, let it be assumed that the first nine digits comprising the first subseries have been received and registered in digit registers 1015, 1050, 1055, 1060, 1100, 1110, 1120, 1130 and 1140, respectively, and that the first digit of the first subseries has been read out of digit register 1015, in the manner previously described. Now let it be further assumed that the tenth digit or the first digit of the second subseries has been received and that, as a result thereof, the steering relay STR 833 (FIG. 8) has operated for the tenth time (see FIG. 12).

Reverting again to FIGS. 6 and 12 and bearing in mind that the operation and locking of the recycle "in" relay RSI 647 has placed the input digit steering circuit 600 in a recycle condition, ground is extended, via relay contacts ON 601, PKC 611, IS5 609, IS4 608, IS3 607, IS2 606, RSI 651, IS9 603, and IS1 604, and the winding of relay IS1 605, to negative battery, causing relay IS1 605 to operate and lock up to ground through relay contact IS1 680 and the above traced path. At this time ground is also extended through relay contacts ON 601 and RSI 652, and the winding of relay RCY 653 to negative battery, causing relay RCY 653 to operate and lock up to ground through its contact RCY 654. At this time, relays RSI 647, RCY 653, and IS1 605 are concurrently operated.

Referring again to FIG. 10, the operation of relay IS1 605 (FIG. 6) causes the closure of the input steering connector front or make contacts IS1 1080, thereby causing ground to be extended therethrough from the pulse repeating circuit 900 (FIG. 9), and causing the operation and locking up of a corresponding combination of relays of digit register circuit 1015, in the manner previously described.

Reverting again to FIGS. 7 and 13 and bearing in mind that the operation and locking of the recycle "out" relay RSO 730 has placed the output digit steering circuit 700 in a recycle condition, when relay W 544 (FIG. 8) operates for the ninth time, incident to outpulsing the ninth digit, causing the operation of relay RSO 730, as previously described, ground is extended, via relay contacts ON 704, MF1 719, W 718, OS1 728, OS2 736, OS3 743, OS4 744, OS5 745, OS6 746, OS7 747, OS8 748, OS9 749, RS0 753, and OS1 706, and the winding of relay OS1 707, to negative battery, causing relay OS1 707 to operate and lock up to ground through relay contacts OS1 708, OS2 754, RS0 755, and ON 704. At the end of the ninth digit, relay W 544 (FIG. 8) releases, opening the locking circuit for relay OS9 738 at contact W 718, and causing relay OS9 738 to release a short time prior to the end of the ninth interdigital interval (see FIG. 13). The operation of relay OS1 707 causes the closure of the output connector steering relay front or make contacts OS1 1081 (FIG. 10), causing the digit stored in digit register 1015 to be read out, in the manner previously described. When relay W 544 (FIG. 5) operates for the tenth time, incident to outpulsing the tenth digit, ground is extended, via relay contacts ON 704, MF1 719, W 718, OS1 720, RS0 756, OS9 722 and OS2 723, and the winding of relay OS2 724 to negative battery, causing relay OS2 724 to operate and lock up to ground over a previously described path. At this time, as is apparent from FIG. 13, relays OS1 707 and OS2 724 are concurrently operated. When at the end of the tenth digit relay W 544 (FIG. 5) again releases, incident to completing the outpulsing of the tenth digit and during the ensuing interdigital interval, the opening of its contact W 718 opens the locking circuit for relay OS1 707, causing relay OS1 707 to release. The release of relay OS1 707 prepares a previously described operating path for relay OS3 727, causing relay OS3 707 to operate in response to the operation of relay W 544 (FIG. 5) incident to outpulsing of the eleventh digit, and to lock up over a previously described path. At this time, as is apparent from FIG. 13, relays OS2 724 and OS3 727 are concurrently operated.

*Register locking circuit*

Referring again to FIG. 10, attention is directed to the condition wherein the front contacts OS2 1070 through OS2 1074 of the second digit output connector are closed and the back contacts OS1 1082 through OS1 1086 of the first digit output connector are closed, thereby connecting the recapture relays 1016 to the digit register 1050. Under this condition, the operation of relay OS3 727 (FIG. 7), at contact OS3 1052, has opened the normal locking path for the relays of digit register 1050; but the operation of relay OS3 727 (FIG. 7), causes ground to be extended, via relay contacts ON 601 (FIG. 6) and MF1 623 (FIG. 6), conductor 1009, continuity contact OS3 1087, and the winding of the auxiliary locking relay BRA 1088, to negative battery, causing relay BRA 1088, after a finite time interval shall have elapsed, to operate and lock up to ground through relay contact BRA 1089, and a previously described path via conductor 1009. With relay BRA 1088 operated, ground is extended from conductor 1009, via relay contact BRA 1090. There is a brief interval between the operation of relay OS3 727 (FIG. 7) and the operation of relay BRA 1088, during which interval both of the contacts OS3 1052 and BRA 1090 are open, as is apparent from FIG. 13. The time interval or delay that elapses between the instant that an energizing circuit for a relay winding (e.g., BRA 1088, FIG. 10) is completed and the subsequent functioning of a contact thereof (e.g., BRA 1090, FIG. 10) is an inherent characteristic of any given relay; such time delay is dependent on the electrical, mechanical, and magnetic structure of the relay, and of its adjustment; and the relay structure productive of this time delay is hereby referred to, in terms of well-known significance to those skilled in the art, as the "dynamic inertia" of the relay. That time interval during which connector relay OS3 727 is operated is resolved into an initial portion and a terminal portion. The initial portion begins at the instant that the winding of auxiliary locking relay BRA 1088 is energized (i.e., the instant that relay OS3 727 closes its make contacts OS3 1087) and ends at the instant that make contact BRA 1090 of relay BRA 1088 closes the auxiliary locking circuit (determined by the dynamic inertia of relay BRA 1088); and the terminal portion begins at the end of the initial portion and ends when the release of connector relay OS3 727 opens its make contacts OS3 1087. During this brief interval when both of the contacts OS3 1052 and BRA 1090 are open, the relays of digit register 1050 release and are in readiness to receive the eleventh digit or the second digit of the second subseries. When relay BRA 1088 has operated and locked, it remains locked up until the release of off-normal relay ON 412 (FIG. 4) at the completion of the use-cycle of the converter.

Reverting again to FIGS. 7 and 13 when the twelfth digit is outpulsed, relay OS4 735 operates in the manner previously described with reference to preceding digits. Relay OS4 735 locks up to ground through its contact OS4 758 and a previously described path. During the interdigital interval between the twelfth and thirteenth digits relay OS3 727 releases, in the manner previously described. At this time, as is apparent from FIG. 13, of the OS– relays only relay OS4 735 is operated.

Referring again to FIG. 10, with relays OS1 707 and OS2 724 (FIG. 7) released, and with relay OS3 725 (FIG. 7) operated, digit register 1055 is now connected so that the digit registered therein may be read out, in a manner previously described with reference to digit register 1050.

Reverting again to FIGS. 7 and 13, at the end of the twelfth digit relay OS3 727 releases, in a manner previously described. When the thirteenth digit is outpulsed, relay W 544 (FIG. 5) again operates, and ground is extended, via relay contacts ON 704, MF1 719, W 718, OS1 728, OS2 736, OS3 743, OS4 759, RSO 760, and W 761, and the winding of slow-to-release relay RL 762, to negative battery, causing relay RL 762 to operate. Because of its slow-to-release characteristic, relay RL 762 remains in an operated condition for a time interval sufficient to ensure the release of the converter circuitry. The release of the converter circuitry opens all of the locking circuits for all of the converter circuit relays, causing them to release, thereby placing the converter circuit in readiness to serve another incoming call.

Reverting again to FIGS. 6 and 12, when the tenth multifrequency digit is received, relay STR 833 (FIG. 8) again operates, and ground is extended, via relay contacts ON 601, STR 612, IS1 613, and IS2 618, and the winding of relay IS2 619, to negative battery, causing relay IS2 619 to operate and lock up to ground over a previously described path. Relays IS1 605 and IS2 619 are now concurrently operated. After the completion of the tenth multifrequency digit, relay STR 833, again releases, and the locking circuit for relay IS1 605 is opened, causing relay IS1 605 to release. In like manner, when the eleventh digit is received, relay IS3 624 is operated and locked up. At this time,, relays IS2 619 and IS3 624 are concurrently operated, as is apparent from FIG. 12.

Referring now to FIGS. 10, 11, 12 and 13, let it be assumed, for example, that the converter input digit steering circuit has successfully caused the registration of the first nine digits (the first subseries), causing the digits to be registered and locked up in digit registers 1015, 1050, 1055, 1060, 1100, 1110, 1120, 1130, and 1140, respectively, under the control of the normal locking circuit, as previously described. Now let it be further assumed, for example, that the first and second digits of the first subseries have been read out of digit registers 1015 and 1050, respectively, incident to the first readout cycle. Now let it be also assumed, for example, that the tenth digit, i.e., the first digit of the second subseries has been registered and locked up in digit register 1015 incident to a recycle condition of the input digit steering circuit 600 (FIG. 6). Let the further assumption be made, for example, that, at this time, the output digit steering relays OS3 727 and OS4 735 (FIG. 7) are concurrently operated incident to the reading out of the third digit of first subseries from digit register 1055.

Under the set of conditions described immediately above, let it now be assumed that the input digit steering relays IS2 619 and IS3 624 (FIG. 6) are concurrently operated incident to the reception of the third multifrequency digit. At this time, the grounds extended, via the front contacts IS2 1051 of the input steering connector relay IS2 619, to the relays of digit register 1050 cause the operation of two of the relays of digit register 1050, and the locking up thereof to ground through relay contact BRA 1090.

As before described, and as is evident from FIG. 13, for each of the digit registers 1015, 1050, 1055, and 1060, respectively, the regular locking circuit is under the control of the next succeeding output connector steering relay and the auxiliary locking circuit is under the control of the auxiliary locking relays ARA 1091, BRA 1088, CRA 1092, and DRA 1093, respectively. Considering, for example, the digit register 1050, the read out interval of digit register 1050 starts at the moment relay OS1 707 (FIG. 7) releases; the normal locking circuit for digit register 1050 remains effective for the interval between the release of relay OS1 707 (FIG. 7) and the operation of relay OS3 727 (FIG. 7); the time during which digit register 1050 is released is the very short interval between the operation of relay OS3 727 and the operation of auxiliary locking relay BRA 1088; and the auxiliary locking path for digit register 1050 becomes effective immediately after relay BRA 1088 has operated and closed its contact BRA 1090 and remains effective until the release of the converter circuit. Whereas, the operation of the locking circuitry has been described with respect to digit register 1050, for example, the locking circuitry for digit registers 1015, 1055 and 1060 operates in the same manner. With this arrangement of locking circuitry each of the digit registers 1015, 1050, 1055, and 1060 will be assured of a locking path at all times, either through a regular locking circuit or an auxiliary locking circuit, except for the brief releasing interval provided between the operation of its respective next succeeding output connector and the operation of the auxiliary locking relay respectively associated with the instant digit register.

Reverting again to FIGS. 6 and 12, when the twelfth multifrequency digit is received, relay STR 833 (FIG. 8) again operates, and ground is extended, via relay contacts ON 601, STR 612, IS1 625, IS2 631, IS3 655, and IS4 656, and the winding of relay IS4 630, to negative battery, causing relay IS4 630 to operate and lock up to ground through relay contacts IS4 657, IS5 609, PKC 611, and ON 601. Relay IS4 630 in operating, at continuity contact IS4 608 opens the locking circuit for relay IS3 624, but at continuity contact IS4 658 establishes a substitute locking circuit for relay IS3 624. Relays IS3 624 and IS4 630 are now concurrently operated, as is evident from FIG. 12.

After the completion of the twelfth digit, relay STR 833 again releases, and the locking circuit for relay IS3 624 is opened, causing relay IS3 624 to release. Relay IS4 630, at this time, is still locked up to ground over a previously described path, under the control of relay contact PKC 611. After the release of relay IS3 624, when the thirteenth digit is received, relay STR 833 (FIG. 8) again operates and ground is extended, via relay contacts ON 601, STR 612, IS1 625, IS2 631, IS3 638, IS4 659, RCY 660, and PKC 661, and the winding of relay PKC 662, to negative battery, causing relay PKC 662 to operate and lock up to ground through relay contacts PKC 663 and ON 681. The operation of relay PKC 662, at relay contact PKC 611, opens the locking circuit for relay IS4 630, causing relay IS4 630 to release. It should be noted that, with relay RCY 653 operated, the operating circuit for relay IS5 664 is opened at relay contact RCY 665, thereby terminating the operation of the input digit steering circuit 600.

*Reorder condition*

As has been heretofore mentioned, it is possible for the customer to key multifrequency digits into the digit register at a rate faster than the digits can be read out of the digit registers and outpulsed. Under such a condition, the converter circuit will set up a "reorder" condition, thereby causing a reorder tone to be transmitted to the customer, as a signal that he should "hang up" and rekey the number.

To illustrate such a condition as described immediately above, let it be assumed, for example, that relay OS1 707 (FIG. 1) is still operated incident to reading out of digit register 1015 (FIG. 10), and that relay OS2 724 (FIG. 7) has not yet operated; and that, at this time, the customer keys the tenth digit (i.e., the first digit of the second subseries). Bearing in mind that the input digit steering circuit 600 has recycled, relay IS1 605 (FIG. 6) is also operated at this time. With relay IS1 605 operated, the front contacts (e.g., IS1 1001 and IS1 1011, FIG. 10) of the input connector are operated. The net result of the above-described condition is that an attempt is being made to read a new digit into the digit register 1015 before the digit previously registered therein shall have been read out.

Under such a condition, ground is extended, via relay contacts ON 601, STR 612, IS1 613, OS1 666, OS2 667, OS3 668, OS4 669, OS5 670, RS0 671, RCY 672, and ROD 673, and the winding of reorder relay ROD 674, to negative battery, causing relay ROD 674 to operate and lock up to ground through relay contacts ROD 675 and ON 676.

Referring again to FIG. 4, relay ROD 674 (FIG. 6) operated, at contact ROD 491, a circuit is closed through capacitor 492 to connect the reorder tone supply 493 to the primary coils 482 and 483 of transformer T 473. The reorder tone is transmitted, via an obvious circuit, to the subscriber customer station 300 (FIG. 3), as a signal for the customer to hang up and rekey the number.

*Counting dial pulses preparatory to release*

Referring again to FIG. 7 the release relay RL 762, the operation of which has previously been described in part, is also operable under the control of the direct current dial pulse counting relays. Relay L1 470 (FIG. 4) operates in response to the establishment of a connection to the incoming line, and then releases and reoperates for each open circuit interval of the line, as previously described. When the line loop is closed and relay L1 470 operates for the first time, ground is extended, via relay contacts ON 701 and L1 702, and the winding of slow-to-release relay L2 703, to negative battery, causing relay L2 703 to operate. At the start of the first dial pulse, the line loop is opened, thereby causing relay L1

470 (FIG. 4) to release and, at contact L1 702, to open the operating circuit for relay L2 703. But, since relay L2 703 is slow-to-release, relay L2 703 remain operated during the open circuit intervals of the line. With relay L1 470 released, ground is extended, via relay contacts ON 701, L1 763 and L2 764, and through the winding of slow-to-release relay L3 765, causing relay L3 765 to operate. At the end of the first dial pulse (or open circuit interval), the line loop is reclosed and relay L1 470 reoperates at its contact L1 702, reclosing the operating circuit for slow-to-release relay L2 703. With relay L1 470 reoperated, at contact L1 763, the operating circuit for relay L3 765 is opened, but, since relay L3 765 is slow-to-release, relay L3 765 remains operated during the series of open-circuit pulses comprising the first digit. Since this is not a multifrequency call, relay MF1 616 (FIG. 6) is not operated. With relay L3 765 operated, ground is extended, via relay contacts ON 701, L3 766, MF1 767, and L4 768, and the winding of relay L4 769, to negative battery causing relay L4 769 to operate and lock up to ground through relay contacts L4 770 and ON 701. After the completion of the first digit relay L3 765 releases. With line relay L1 470 reoperated (at the end of the first digit) and with relay L3 765 release, ground is extended, via relay contacts ON 701, L1 771, L3 772, and L4 773, and through the winding of release relay RL 762, causing relay RL 762 to operate. As previously stated, relay RL 762 is slow-to-release and will remain operated for a time interval of sufficient duration to effect the release of all of the connector circuitry, following which relay RL 762 will release. The above-described dial-pulse-controlled release circuitry is disclosed and claimed in the aforementioned Kuchas disclosure.

It is to be understood that the above-described arrangements are illustrative of the application of the principles of the invention. Numerous other equivalent arrangements may be devised by those skilled in the art without departing from the spirit and scope of the invention.

What is claimed is:

1. A recyclable multidigit register circuit comprising: a plurality of operable, lockable and releasable digit registers; input means for receiving a series of digits exceeding in number the number of said registers and for sequentially operating consecutive registers in accordance with a first sub-series of said digits equal in number to the number of said registers, thereby to register consecutive digits of said sub-series in corresponding consecutive registers; an operable and releasable read-out connector for each register; connector control means controlled by operated said registers to sequentially operate and to sequentially release said connectors for sequentially reading out said sub-series digit registrations in the order of registration thereof; each of an initial consecutive sub-plurality of particular said registers having first and second energizable locking circuits connected in parallel; the first locking circuit for a said particular register controlled by a prescribed succeeding register connector so that said first locking circuit is energized during the interval when said prescribed connector is released and is deenergized during the interval when said prescribed connector is operated; the operated interval of said prescribed connector consisting of an initial portion and a terminal portion, said initial portion beginning at the time said prescribed connector is operated and ending at the beginning of said terminal portion, said terminal portion beginning at the ending of said initial portion and ending at the time said prescribed connector is released; the second locking circuit for said particular register controlled by said prescribed connector so that said second locking circuit is deenergized during the said initial portion and is energized during the said terminal portion; and, means effective under the control of said input means incident to reception of the last digit of said first sub-series for causing said input means to sequentially reoperate consecutive ones of said sub-plurality of particular registers in accordance with the remainder of said received digits in excess of said first sub-series, the rate at which said digits are received being sufficiently faster than the rate at which said registered digits are read out so as to require energization of the said second locking circuits of said reoperated particular registers during the said terminal portions of said corresponding prescribed connector operated intervals.

2. The invention defined in claim 1 wherein said second locking circuit for said particular register comprises time delay means controlled by said prescribed connector at the beginning of said initial portion to measure a time delay equal to said initial portion and to energize said second locking circuit at the ending of said initial portion and throughout the said terminal portion.

3. The invention defined in claim 2: wherein said time delay means comprises a relay having an operating winding energizable to operate said relay, having contacts controlled by the operation of said relay, and having timing means effective upon the energization of said winding to delay operation of said relay for said delay time measured from the said time of winding energization; wherein said winding energization is effected by the operation of said prescribed connector; and, wherein said relay contacts energize said second locking circuit when and while the said relay is operated.

4. The invention defined in claim 3: wherein said prescribed connector comprises contacts controlled thereby; wherein is provided a source of locking signal; wherein each said particular register comprises a locking conductor; wherein said first locking circuit includes said prescribed connector contacts to apply said locking signal to said locking conductor during the released interval of said prescribed connector and to remove said locking signal from said locking conductor during the operated interval of said prescribed connector; and, wherein said second locking circuit includes said relay contacts to apply said locking signal to said locking conductor when and while said relay is operated.

5. The invention defined in claim 4: wherein said timing means comprises the inherent structural characteristic of said relay determining the operating time delay from winding energization; wherein said prescribed connector contacts are break contacts in series between said locking conductor and said locking signal source; and, wherein said relay contacts are make contacts in parallel with the said break contacts of said prescribed connector.

6. The invention defined in claim 5: wherein the said prescribed connector for a said particular register is the read-out connector for that said register next succeeding the said particular register.

References Cited by the Examiner

UNITED STATES PATENTS

| | | | |
|---|---|---|---|
| 2,167,710 | 8/1939 | Crocker | 179—27 |
| 2,511,145 | 6/1950 | Balzer | 179—27 |
| 2,724,020 | 11/1955 | Judy | 179—18 |
| 2,969,522 | 1/1961 | Crosby | 340—172.5 |
| 3,040,299 | 6/1962 | Crosby et al. | 340—172.5 |

ROBERT H. ROSE, *Primary Examiner.*

WALTER L. LYNDE, *Examiner.*